United States Patent
Lee

(10) Patent No.: US 9,259,662 B2
(45) Date of Patent: Feb. 16, 2016

(54) PHOTOVOLTAIC PANEL-INTERFACED SOLAR-GREENHOUSE DISTILLATION SYSTEMS

(76) Inventor: James Weifu Lee, Cockeysville, MD (US)

( * ) Notice: Subject to any disclaimer, the term of this patent is extended or adjusted under 35 U.S.C. 154(b) by 539 days.

(21) Appl. No.: 13/569,261

(22) Filed: Aug. 8, 2012

(65) Prior Publication Data
US 2012/0298499 A1    Nov. 29, 2012

Related U.S. Application Data

(63) Continuation-in-part of application No. 12/975,307, filed on Dec. 21, 2010, now Pat. No. 8,673,119, which is a continuation-in-part of application No. 12/918,811, filed as application No.
(Continued)

(51) Int. Cl.
| | | |
|---|---|---|
| *B01D 3/00* | (2006.01) | |
| *B01D 1/00* | (2006.01) | |
| *B01D 5/00* | (2006.01) | |

(52) U.S. Cl.
CPC ............... *B01D 1/0035* (2013.01); *B01D 3/00* (2013.01); *B01D 5/0006* (2013.01); *B01D 5/009* (2013.01); *B01D 5/0066* (2013.01)

(58) Field of Classification Search
CPC .. B01D 1/0035; B01D 5/0006; B01D 5/0066; B01D 5/009; B01D 3/00
USPC .................... 435/257.1; 203/98, 100; 202/234
See application file for complete search history.

(56) References Cited

U.S. PATENT DOCUMENTS

| | | |
|---|---|---|
| 4,249,516 A | 2/1981 | Stark |
| 6,635,177 B2 | 10/2003 | Oswald et al. |
| 6,699,696 B2 | 3/2004 | Woods et al. |

(Continued)

FOREIGN PATENT DOCUMENTS

| | | |
|---|---|---|
| CN | 101748069 A | 6/2010 |
| WO | 2005100582 A2 | 10/2005 |

(Continued)

OTHER PUBLICATIONS

Pickett-Heap et al, "The Cytoplast Concept in Dividing Plant Cells: Cytoplasmic Domains and the Evolution of Spatially Organized Cell Division", 1999, Am J. of Botany, 86:153-172.

(Continued)

*Primary Examiner* — Kent L Bell
(74) *Attorney, Agent, or Firm* — George Willinghan

(57) ABSTRACT

A hybrid photovoltaic panel-interfaced solar-greenhouse distillation technology is disclosed that is capable of utilizing solar waste heat to perform liquid distillation while co-generating solar electricity. Solar waste heat co-generated at a photovoltaic panel is effectively utilized by in situ distillation liquid as an immediate heat sink in thermal contact with the photovoltaic panel, thus providing beneficial cooling of the photovoltaic panel and co-making of distillation products while generating electricity with significant improvement on total-process solar energy utilization efficiency. Use of this invention can provide a series of distillation-related products such as freshwater, distilled water, hot water, hot steam, sea salts, saline/brine products, and/or harvest biofuels and bio-products such as ethanol from renewable resources while co-generating solar electricity.

6 Claims, 16 Drawing Sheets

Related U.S. Application Data

PCT/US2009/034780 on Feb. 20, 2009, now Pat. No. 8,753,837.

(60) Provisional application No. 61/066,770, filed on Feb. 22, 2008, provisional application No. 61/066,771, filed on Feb. 22, 2008, provisional application No. 61/066,832, filed on Feb. 23, 2008.

(56) References Cited

U.S. PATENT DOCUMENTS

| | | | |
|---|---|---|---|
| 7,081,567 | B2 | 7/2006 | Xue et al. |
| 7,682,821 | B2 | 3/2010 | Woods et al. |
| 7,973,214 | B2 | 7/2011 | Lee |
| 8,673,119 | B2 * | 3/2014 | Lee ................................ 203/98 |
| 2002/0042111 | A1 | 4/2002 | Woods et al. |
| 2004/0081638 | A1 | 4/2004 | Kyle |
| 2006/0119066 | A1 | 6/2006 | Chuang |
| 2007/0037196 | A1 | 2/2007 | Gibson et al. |
| 2007/0037197 | A1 | 2/2007 | Young et al. |
| 2007/0065035 | A1 | 3/2007 | Chi |
| 2007/0092957 | A1 | 4/2007 | Donaldson et al. |
| 2007/0122826 | A1 | 5/2007 | Glass et al. |
| 2007/0128648 | A1 | 6/2007 | Li et al. |
| 2007/0128649 | A1 | 6/2007 | Young |
| 2007/0264688 | A1 | 11/2007 | Venter et al. |
| 2007/0269862 | A1 | 11/2007 | Glass et al. |
| 2008/0176304 | A1 | 7/2008 | Lee |
| 2009/0081746 | A1 | 3/2009 | Liao et al. |
| 2009/0111154 | A1 | 4/2009 | Liao et al. |
| 2009/0130734 | A1 | 5/2009 | Mets |
| 2009/0176280 | A1 | 7/2009 | Ill et al. |
| 2009/0203070 | A1 | 8/2009 | Devroe et al. |
| 2010/0105103 | A1 | 4/2010 | Juan et al. |
| 2010/0151545 | A1 | 6/2010 | Roessler et al. |
| 2010/0209986 | A1 | 8/2010 | Liao et al. |
| 2010/0221800 | A1 | 9/2010 | Liao et al. |
| 2010/0279390 | A1 | 11/2010 | Saphire |
| 2010/0330637 | A1 | 12/2010 | Lee |
| 2011/0104791 | A1 | 5/2011 | Gajraj |
| 2012/0298499 | A1 | 11/2012 | Lee |

FOREIGN PATENT DOCUMENTS

| | | |
|---|---|---|
| WO | 2006119066 A2 | 11/2006 |
| WO | 2007032837 A2 | 3/2007 |
| WO | 2007047148 A1 | 4/2007 |
| WO | 2007065035 A2 | 6/2007 |
| WO | 2008006038 A2 | 1/2008 |
| WO | 2008039450 A2 | 4/2008 |
| WO | 2008142459 A2 | 11/2008 |
| WO | 2009005453 A1 | 1/2009 |
| WO | 2007134340 | 7/2009 |
| WO | 2010068821 A1 | 6/2010 |

OTHER PUBLICATIONS

Qureshi, Hughes, Maddox, and Cotta, "Energy Efficient Recovery of Butanol from Model Solutions and Fermentation Broth by Adsorption", 2005 Bioprocess Biosyst Eng 27: 215-222).
R. Radakovits et al., "Genetic Engineering of Algae for Enhanced Biofuel Production", Eukaryotic Cell, vol. 9, No. 4, Apr. 1, 2010, pp. 486-501.
Raines, "The Calvin Cycle Revisited", 2003, Photosynthesis Res., 75:1-10.
Ramesh V. Nair et al., Regulation of the sol Locus Genes for Butanol and Acetone Formation in Clostridium acetobutylicum ATCC 824 by a Putative Transcriptional Repressor, Journal of Bacteriology, Jan. 1999, vol. 181, N.1, p. 319-300.
Sanderson, "A Field in Ferment", 2006, Nature, 444:673-676.
(Casey and Grossman (1994) "In vivo and in vitro characterization of the light-regulated cpcB2A2 promoter of *Fremyella diplosiphon*" Journal of Bacteriology, 176(20):6362-6374).
Shen et al., "Metabolic Engineering of *Escherichia coli* for 1-butanl and 1-propanol Production via keto-acid pathways", Metabolic Engineering 10(2008) 312-320.
(Domain, Houot, Chauvat, and Cassier-Chauvat (2004) "Function and regulation of the cyanobacterial genes lexA, recA and ruvB: LexA is critical to the survival of cells facing inorganic carbon starvation," Molecular Microbiology, 53 (1):65-80).
(Durre, P. 1998 Appl Microbiol Biotechnol 49: 639-648.
(Fang and Barnum (2004) "Expression of the heat shock gene hsp16.6 and promoter analysis in the Cyanobacterium, Synechocystis sp. PCC 6803," Current Microbiology 49:192-198).
(Fire, Xu, Montgomery, Kostas, Driver, Mello (1998) "Potent and specific genetic interference by double-stranded RNA in *Caenorhabditis elegans*". Nature 391(6669):806-11.
(Fuhrmann, Stahlberg, Govorunova, Rank and Hegemann (2001) Journal of Cell Science 114:3857-3863).
(Gfeller and Gibbs (1984) "Fermentative metabolism of *Chlamydomonas reinhardtii*," Plant Physiol. 75:212-218).
(Griffin, Adams, and Tsien (1998), "Specific covalent labeling of recombinant protein molecules inside live cells", Science, 281:269-272).
(Hirano, Ueda, Hirayama, and Ogushi (1997) "CO2 fixation and ethanol production with microalgal photosynthesis and intracellular anaerobic fermentation" Energy 22(2/3): 137-142).
(Keppetipola, Coffman, and et al (2003). Rapid detection of in vitro expressed proteins using LumioTM technology, Gene Expression, 25.3: 7-11).
(Lee, Blankinship and Greenbaum (1995), "Temperature effect on production of hydrogen and oxygen by Chlamydomonas cold strain CCMP1619 and wild type 137c," Applied Biochemistry and Biotechnology 51/52:379-386).
(Lee, Mets, and Greenbaum (2002). "Improvement of photosynthetic efficiency at high light intensity through reduction of chlorophyll antenna size," Applied Biochemistry and Biotechnology, 98-100: 37-48).
(Liszewski (Jun. 1, 2003) Progress in RNA interference, Genetic Engineering News, vol. 23, No. 11, pp. 1-59).
(Loppes and Radoux (2002) "Two short regions of the promoter are essential for activation and repression of the nitrate reductase gene in *Chlamydomonas reinhardtii*," Mol Genet Genomics 268: 42-48).
(Michel, Pistorius, and Golden (2001) "Unusual regulatory elements for iron deficiency induction of the idiA gene of *Synechococcus elongatus* PCC 7942" Journal of Bacteriology, 183(17):5015-5024).
(Muto, Miyachi, Usuda, Edwards and Bassham (1981) "Light-induced conversion of nicotinamide adenine dinucleotide to nicotinamide adenine dinucleotide phosphate in higher plant leaves," Plant Physiology 68(2):324-328.
(Nakajima, Tsuzuki, and Ueda (1999) "Reduced photoinhibition of a phycocyanin-deficient mutant of Synechocystis PCC 6714", Journal of Applied Phycology 10: 447-452).
(Nakamoto, Suzuki, and Roy (2000) "Constitutive expression of a small heat-shock protein confers cellular thermotolerance and thermal protection to the photosynthetic apparatus in cyanobacteria," FEBS Letters 483:169-174).
(Pattanayak and Chatterjee (1998) "Nicotinamide adenine dinucleotide phosphate phosphatase facilitates dark reduction of nitrate: regulation by nitrate and ammonia," Biologia Plantarium 41(1):75-84).
(Patterson-Fortin, Colvin and Owttrim (2006) "A LexA-related protein regulates redox-sensitive expression of the cyanobacterial RNA helicase, crhR", Nucleic Acids Research, 34(12):3446-3454).
(Qi, Hao, Ng, Slater, Baszis, Weiss, and Valentin (2005) "Application of the Synechococcus nirA promoter to establish an inducible expression system for engineering the *Synechocystis tocopherol* pathway," Applied and Environmental Microbiology, 71(10): 5678-5684.
(Quinn, Barraco, Ericksson and Merchant (2000). "Coordinate copper- and oxygen-responsive Cyc6 and Cpx1 expression in Chlamydomonas is mediated by the same element." J Biol Chem 275: 6080-6089).
(Sjoholm, Oliveira, and Lindblad (2007) "Transcription and regulation of the bidirectional hydrogenase in the Cyanobacterium Nostoc sp. strain PCC 7120," Applied and Environmental Microbiology, 73(17): 5435-5446).

(56) References Cited

OTHER PUBLICATIONS

[Kojima and Nakamoto (2007) "A novel light- and heat-responsive regulation of the groE transcription in the absence of HrcA or CIRCE in cyanobacteria," FEBS Letters 581:1871-1880).

7942 (Erbe, Adams, Taylor and Hall (1996) "Cyanobacteria carrying an smt-lux transcriptional fusion as biosensors for the detection of heavy metal cations," Journal of Industrial Microbiology, 17:80-83).

Al Kasabi et al., "Design of a Commercial Solar-Powered Greenhouse", (1981) 39:53-62.

Atsumi et al.; "Diret Photosynthetic Recycling of Carbon Dioxide to Isobutyraldehyde", Nature Biotechnology 27 (12)1177-1180 (2009).

Atsumi, S. et al., "Non-fermentative Pathways for Synthesis of Branched-Chain Higher Alcohols as Biofuels", Nature, Jan. 2008, vol. 451, pp. 86-90.

B. Wu et al., "Alternative Isoleucine Synthesis Pathway in Cyanobacterial Species", Microbiology, vol. 156, No. 2, Oct. 29, 2009, pp. 596-602.

Ben-Amotz et al., "Accumulation of Metabolites by Halotolerant Algae and Its Industrial Potential", (1983) Annual Reviews of Microbiology 37: 95-119.

Chen et al., "Photosynthetic Apparatus of Antenna-Reaction Centers Supercomplexes in Oxyphotobacteria: Insight through Significance of Pcb/Isi A Proteins", Photo Res., 2005, 86:165-173.

Deng M. and Coleman. J.R., "Ethanol Synthesis by Genetic Engineering in Cyanobateria", Applied and Environmental Microbiology, 1999, vol. 65, No. 2, pp. 523-528.

Dykxhoom, Novina, Sharp (2003) "Killing the messenger: short RNAs that silence gene expression", Nat Rev Mol Cell Biol. 4(6):457-67.

E.I. Lan and J. Liao; "Metabolic engineering of Cyanobacteria for 1-Butanol Production from Carbon Dioxide", Metabolic Engineering, vol. 13, No. 4, Jul. 1, 2011, pp. 353-363.

El-Haggar et al., "Optimum Conditions for a Solar Still and Its Use for a Greenhouse Using the Nutrient Film Technique", (1993) Desalination 94: 55-68.

Extended European Search Report from corresponding European Patent Application No. 09712906.8-2405 (Nov. 8, 2011).

Habibollah Younesi, "Ethanol and Acetate Production from Synthesis Gas via Fermentation Processes Using Anaerobic Bacterium, Clostridium ljungdahiii", In: Biochemical Engineering Journal, Dec. 15, 2005, vol. 27(2), pp. 110-119.

Haldor-Topscoe Corporation (2009) "Claus Unit Tail Gas Treatment Catalysts" product Flyer, Corporate PRO1, 2009. 1.

Jones et al., "Acetone-Butanol Fermentation Revisited", 1986, Microbiol. Rev., 50:484-524.

Kaneko Takakazu et al., "Complete Genomic Sequence of the Filamentous Nitrogen Fixing Cyanobacterium Anabaena sp. Strain PCC 7120"; DNA Research 8, 205-213 (2001).

Lee et al., "Discovery of an Alternative Oxygen Sensitivity in Algal Photosynthetic H2 Production", Proceedings of the 2000 U.S. DOE Hydrogen Program Review, NREL/CP-570-28890.

Maeda, Kawaguchi, Ohe, and Omata (1998) "cis-Acting sequences required for NtcB-dependent, nitrite-responsive positive regulation of the nitrate assimilation operon in the Cyanobacterium Synechococcus sp. strain PCC 7942," Journal of Bacteriology, 180(16):4080-4088).

Matsumura-Kadota, Muto, Miyachi (1982) "Light-induced conversion of NAD+ to NADP+ in Chlorella cells," Biochimica Biophysica Acta 679(2):300-300).

Palenik et al.,"Multiple Evolutionary Origins of Prochlorophytes, the Chlorophyll b-containing Prokaryotes", (1992) Nature 355: 265-267.

Palligarnai T. Vasudevan et al., "Biodiesel Production: Current State of the Art and Challenges", Journal of Industrial Microbiology & Biotechnology' Springer, Berlin, DE, vol. 35, No. 5, Jan. 18, 2008.

* cited by examiner

PHOTOVOLTAIC PANEL-INTERFACED SOLAR-GREENHOUSE DISTILLATION SYSTEMS

CROSS-REFERENCE TO RELATED APPLICATIONS

This application is a continuation-in-part of co-pending U.S. patent application Ser. No. 12/975,307 filed on Dec. 21, 2010, which is a continuation-in-part of co-pending U.S. patent application Ser. No. 12/918,811 filed on Aug. 21, 2010, which is the National Stage of International Application No. PCT/US2009/034780 filed on Feb. 20, 2009, which claims the benefit of U.S. Provisional Application No. 61/066,770 filed on Feb. 22, 2008, U.S. Provisional Application No. 61/066,771 filed on Feb. 22, 2008, and U.S. Provisional Application No. 61/066,832 filed on Feb. 23, 2008. The entire disclosures of all of these applications are incorporated herein by reference.

FIELD OF THE INVENTION

The present invention generally relates to solar energy technology. More specifically, the present invention provides a hybrid solar panel-interfaced solar-greenhouse distillation technology for co-generating electricity while utilizing its waste solar heat to make a series of distillation related products such as freshwater (distilled water), sea salt, saline/brine products, and brine algal mass culture for production of advanced biofuels and bioproducts.

BACKGROUND OF THE INVENTION

Photovoltaics is the field of technology and research related to the practical application of photovoltaic cells in producing electricity from solar radiation (sunlight). Photovoltaic cells are often electrically connected and encapsulated as a module (photovoltaic panel). Photovoltaic electricity generation employs solar photovoltaic panels typically containing a number of photovoltaic cells containing a photovoltaic material. Materials presently used for photovoltaics include monocrystalline silicon, polycrystalline silicon, amorphous silicon, cadmium telluride, and copper indium selenide/sulfide. When a photon is absorbed by a photovoltaic cell, it can produce an electron-hole pair. One of the electric charge carriers may reach the p-n junction and contribute to the current produced by the solar cell, or the carriers recombine with no net contribution to electric current, but generating heat. Furthermore, a photon with its energy (hv) below the band gap of the absorber material cannot generate a hole-electron pair, and so its energy is not converted to useful output and only generates heat if absorbed. For a photon with its energy (hv) above the band gap energy, only a fraction of the energy above the band gap can be converted to useful output. When a photon of greater energy is absorbed, the excess energy above the band gap is converted to kinetic energy of the carrier combination. The excess kinetic energy is converted to heat through phonon interactions as the kinetic energy of the carriers slowing to equilibrium velocity. Consequently, photovoltaic cells operate as quantum energy conversion devices with thermodynamic efficiency limit. Today's photovoltaic panels typically convert about 15% of the solar energy they capture from the sun into electricity, leaving 85% to be dissipated as heat. This creates a major thermal design challenge since every degree of temperature rise in the photovoltaic panels reduces the power produced by 0.5%. For example, a high quality monocrystalline silicon solar cell, at 25° C. cell temperature, may produce 0.60 volts open-circuit. The cell temperature in full sunlight, even with 25° C. air temperature, will probably be close to 45° C., reducing the open-circuit voltage to 0.55 volts per cell.

Therefore, a major design challenge for the manufacturers of photovoltaic panels is keeping them cool. Adding forced air cooling would add to the cost and maintenance requirements and consume a significant amount of energy; therefore, nearly all photovoltaic panels are cooled solely by natural convection. This explains why, presently, most commercial modules are constructed in such a way that air can flow under the photovoltaic panels in order to maximize convective cooling. However, in all those cases, the solar heat is wasted without any utilization. Therefore, any new approach that could utilize and remove the solar waste heat in a productive manner while generating photovoltaic electricity would be helpful to improving the overall system productivity and energy efficiency.

Desalination of seawater is another major challenge related to energy and sustainability on Earth. In many parts of the world, freshwater is in short supply. Salt is often quite expensive to remove from seawater, and salt content is an important factor in water use, i.e., potability. Currently, multi-stage flash distillation and reverse osmosis are the two major engineering processes for desalination of seawater. Both of the processes are energy intensive and discharge significant amounts of brine liquid into the environment, which is an environmental concern.

International Application No. PCT/US2009/034780 discloses a set of methods (1) on synthetic biology to create designer photosynthetic organisms (such as oxyphotobacteria, also known as blue-green algae) for photobiological production of advanced biofuels such as ethanol from carbon dioxide ($CO_2$) and water ($H_2O$) and (2) on a greenhouse distillation system technology to harvest the photobiologically produced ethanol from the ethanol-producing algal liquid mass culture.

SUMMARY OF THE INVENTION

The present invention is directed to a method based on a hybrid photovoltaic panel-interfaced solar-greenhouse distillation technology, in which the cooling of a solar photovoltaic panel is achieved by an in situ liquid-containing distillation chamber so that the solar waste heat is beneficially utilized, i.e., removed, through liquid distillation, providing effective cooling of the photovoltaic panel for enhanced solar energy utilization efficiency. This technology is capable of performing solar-greenhouse distillation for various liquids to harvest certain solvents, e.g., ethanol, and solute, e.g., salt and sugar, while co-generating solar electricity. The photovoltaic panel-interfaced solar-greenhouse distillation system technology can also serve as a special tool for desalination of seawater to make freshwater (distilled water), sea salt, boiled water, hot steam and saline/brine products while co-generating photovoltaic electricity. Since the present invention enables beneficial utilization of photovoltaic panel waste heat for solar-greenhouse distillation, it not only addresses the waste heat issue in photovoltaics but also provides other benefits including helping overcome the challenges in seawater desalination for production of distilled water, sea salt, and in harvesting advanced biofuels and bioproducts from renewable resources important to sustainable development on Earth. Exemplary embodiments in accordance with the present invention include the photovoltaic panel-interfaced distillation solar-house apparatuses, the associated operational processes and applications thereof.

In accordance with one of exemplary embodiments, an air-erectable photovoltaic panel-interfaced distillation solarhouse system comprises a back-insulated solar photovoltaic panel as its base, a heat-conducting transparent protective plate or film interfacing in between the photovoltaic panel front surface and the distillation chamber liquid, a tilted or arch-shaped vapor-condensing transparent ceiling (for example, a transparent plastic cover) as its top, liquid-tight and air-tight sealing materials (for example, a transparent plastic film) as its wall, a set of condensate-collecting ducts located around the solarhouse wall below the ceiling level, a condensate collecting tube linked between the condensate-collecting ducts system and a condensate tank and a source liquid inlet and an adjustable liquid outlet in communication with the distillation liquid chamber.

In accordance with one exemplary embodiment, a photovoltaic panel-interfaced distillation solarhouse system comprises a photovoltaic solarhouse coupled with a distillation chamber through a self-sustained circulating coolant fluid for heat exchange to make freshwater by distillation while co-generating solar electricity.

According to one embodiment, the photovoltaic panel-interfaced distillation solarhouse is a sunlight-concentrating photovoltaic-panel-interfaced distillation solarhouse system that includes a sunlight focusing lens and/or mirror system, a highly heat-tolerant (HT) photovoltaic panel as its base, a heat-conducting transparent protective plate or film interfacing in between the photovoltaic panel front surface and the distillation chamber liquid, an arch-shaped vapor-condensing transparent ceiling as its top, liquid-tight and air-tight sealing materials as its wall, a set of condensate-collecting ducts located around the solarhouse wall below the ceiling level, a condensate collecting tube connected between the condensate-collecting ducts system and a condensate tank, a source liquid inlet, an adjustable liquid outlet and a steam outlet in communication with the distillation liquid chamber.

In accordance with the present invention, the solar waste heat generated at a photovoltaic panel is effectively utilized, i.e., removed, by in situ solarhouse distillation with its distillation liquid as an immediate heat sink in thermal contact through a heat-conducting transparent protective plate or film with the photovoltaic panel, providing effective cooling of the photovoltaic panel for enhanced solar energy utilization efficiency. Exemplary embodiments of the present invention enable the utilization of the associated solar waste heat to drive liquid distillation to make a series of beneficial products including, but not limited to, freshwater, distilled water, hot steam, sea salts, saline/brine products and saline/brine photobiological cultures, in addition to solar electricity. Therefore, use of the present invention with greenhouse-distillation-related applications yields significantly higher solar energy utilization efficiency than the conventional use of a photovoltaic panel for solar electricity generation alone.

According to another embodiment, use of a photovoltaic panel-interfaced distillation solarhouse system performs distillation for a number of liquids including, but not limited to, seawater, brackish water, saline water, brine liquid, surface water, ground water, well-water, nonpotable water, photobiological liquid culture media, beer, methanol solutions, ethanol solutions, propanol solutions, 1-hydroxy-2-propanone solutions, butanol/isobutanol solutions, cyclohexanol solutions, tert-amyl alcohol, pentanol solutions, hexadecan-1-ol solutions, polyhydric alcohols solutions, primary alcohol solutions, higher alcohols solutions, aldehyde solutions, aldehyde hydrate solutions, carboxylic acids solutions, lactose solutions, biomass-derived hydrolysate solutions, glucose solutions, fructose solutions, sucrose solutions, furanose solutions, pyranose solutions, monosaccharides solutions, oligosaccharides solutions, polysaccharides solutions, acetic acid solutions, propionic acid solutions, citric acid solutions, lactic acid solutions, acetone solutions, other organic solutions and/or solvents and combinations thereof.

Exemplary embodiments in accordance with the present invention serve as an effective tool for desalination of seawater to make freshwater, sea salts and brine products while simultaneously co-generating solar electricity. Since the photovoltaic panel-interfaced distillation process is operated in a sealed solarhouse chamber, the distillation liquid can be protected from contaminates from which a conventional open pond salt farm suffers including rain, dust, insects, animal waste such as bird droppings and other undesirable environmental elements or contaminates. Therefore, use of a rain-proof/dust-proof photovoltaic panel-interfaced distillation solarhouse more reliably produces clean and quality sea salt products than a conventional salt farm. Unlike the conventional open pond/pan salt farms that generally require a relatively dry season (any unseasonal rains could ruin their salt farm harvest), the use of a photovoltaic-panel-interfaced distillation solarhouse system enables the making of quality sea salts from seawater/brine even in a rainy season or rainy geographic area.

Use of the photovoltaic panel-interfaced solar-greenhouse technology in accordance with the present invention and its associated brine product facilitates the use of certain high salinity-tolerant algal strains that enable effective utilization of the brine product as an algal mass culture medium for photobiological production of advanced biofuels and bioproducts from $CO_2$ and $H_2O$. The advanced biofuels and bioproducts that may be produced through brine algal mass culture with synthetic biology are selected from the group consisting of hydrogen, ethanol, butanol/isobutanol, propanol, pentanol, hexanol, heptanol, octanol, nonanol, decanol, undecanol, dodecanol, tetradecanol, cetyl alcohol, stearyl alcohol, long chain alcohols, branched chain alcohols, higher alcohols, isoprenoids, hydrocarbons, biooils, lipids, DHA omega-3 fatty acid, EPA omega-3 fatty acid, ARA omega-6 fatty acid, acetic acid, proteins, chlorophylls, carotenoids, phycocyanins, allophycocyanin, phycoerythrin, their derivatives/related species and combinations thereof.

According to another exemplary embodiment of the present invention, any number of various photovoltaic panel-interfaced distillation solarhouses are used in series, in parallel, and/or in combination with photobioreactors/greenhouse distillation systems to achieve more desirable results such as production and harvesting of advanced biofuels and bioproducts such as ethanol. Therefore, the present invention represents a clean/green solar energy technology system that has many applications for sustainable development on Earth.

DETAILED DESCRIPTION OF THE INVENTION

Figure 1:
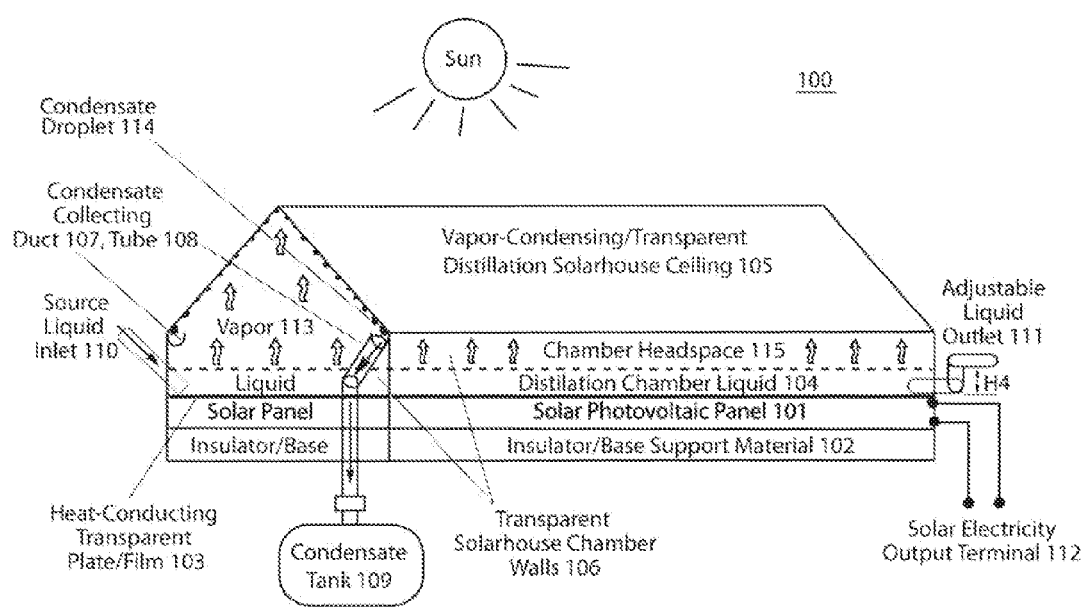
FIG. 1 is a representation of an embodiment of a photovoltaic panel-interfaced solarhouse distillation system in accordance with the present invention that enables the utilization of solar waste heat for liquid distillation while co-generating solar electricity.

Exemplary embodiments in accordance with the present invention are directed to a method based on a hybrid photovoltaic panel-interfaced solar-greenhouse distillation technology system for generation of electricity, freshwater, distilled water, hot steam, salts, saline/brine products and saline/brine-photobiological culture for advanced biofuels and bioproducts such as ethanol. Methods in accordance with the present invention yield significantly higher total solar energy utilization efficiency than that of a photovoltaic panel for electricity generation alone.

Presently, the majority of commercial photovoltaic panels (modules) are used typically with an inverter to convert the DC to AC electricity for grid connected power generation. Based on the solar energy conversion efficiency of around 15% for the presently available commercial photovoltaic panels, about 85% of the solar energy is dissipated as heat at the photovoltaic panels. As mentioned before, the waste solar heat energy can often heat up the photovoltaic panels and result in a negative effect on photovoltaic cell energy conversion efficiencies. The power generated by photovoltaic panels decreases as their temperature increases at a rate of about 0.5% per degree Centigrade (° C.) at a temperature above 25° C. Therefore, a major design challenge for the manufacturers of photovoltaic panels is keeping them cool. Presently, most commercial modules are constructed in a way typically to allow air flow under the panels in order to maximize convective cooling. However, in all those cases, the solar heat is wasted without any utilization. Consequently, the conventional use of photovoltaic panels wastes as much as about 85% of the solar energy. The present invention overcomes this challenge through productive utilization of the associated solar waste heat with a greenhouse-type distillation process, resulting in a major improvement on solar energy utilization efficiency and providing a series of win-win benefits from electricity generation to making of freshwater, sea salt, hot steam and brine photobiological mass culture for production and harvesting of advanced biofuels and bioproducts.

The hybrid photovoltaic panel-interfaced solarhouse distillation method utilizes or removes the solar waste heat generated at a photovoltaic panel by in situ solar-greenhouse distillation with its distillation liquid as an immediate heat sink in thermal contact through a heat-conducting transparent protective plate or film with the photovoltaic panel, providing effective cooling of the photovoltaic panel for enhanced solar energy utilization efficiency. Under certain conditions, the utilization of the associated solar waste heat provides an effective cooling process to maintain a relatively stable temperature environment beneficial to the performance of photovoltaic panels. Use of the photovoltaic panel-interfaced distillation system enables the beneficial utilization of the solar waste heat to drive liquid distillation to produce a series of beneficial products including, but not limited to, freshwater, distilled water, hot liquid, hot steam, sea salts, saline/brine products and saline/brine photobiological cultures, in addition to solar electricity. Furthermore, use of the photovoltaic panel-interfaced solar-greenhouse technology also enables harvesting of biofuels and bioproducts such as ethanol from renewable resources including "cellulosic ethanol" and photobiological ethanol. As a result, use of this invention with solar-greenhouse-distillation-related applications yields significantly higher total solar energy utilization efficiency and provides more benefits than the conventional use of a photovoltaic panel for solar electricity generation alone.

Accordingly, the present invention provides, inter alia, methods for producing solar electricity, freshwater, distilled water, hot liquid, hot steam, sea salts, saline/brine products, and for harvesting biofuels and bioproducts based on photovoltaic panel-interfaced distillation solar-greenhouse technology systems that include the photovoltaic panel-interfaced distillation solar-greenhouse apparatuses and the associated processes. The various aspects of the present invention are described in further detail hereinbelow.

Photovoltaic Panel-Interfaced Distillation Solarhouse Systems

Referring to FIG. 1, in one embodiment, a photovoltaic panel-interfaced distillation solarhouse system 100 is illustrated. The photovoltaic panel-interfaced distillation solarhouse system is a sealed distillation liquid chamber system that includes a bottom- or back-insulated solar photovoltaic panel 101 mounted on an insulator base 102 constructed of a support material. The photovoltaic panel is in communication with solar electricity output terminals 112 for harvesting the electrical energy generated. These terminals can be in communication with an electrical load or a storage source such as one or more batteries. A heat-conducting transparent protective plate or film 103 is provided interfacing in between the photovoltaic panel 101 front surface and the distillation chamber liquid 104. The solarhouse system also includes a tilted or angled vapor-condensing transparent ceiling 105 constructed from a transparent material such as transparent plastic cover and forming the top of the solarhouse system and a plurality of walls 106 forming the sides of the solarhouse system and supporting the transparent ceiling 105. Suitable materials for the walls 106 include, but are not limited to, liquid-tight and air-tight sealing materials, e.g., transparent plastic film. The distillation chamber is formed by the heat-conducting transparent protective plate or film 103 (on top of the photovoltaic panel 101 front surface) as its bottom, the walls 106 as its sides, and the transparent ceiling 105 of the solarhouse system as its (the chamber's) top. The headspace 115 within the chamber above the distillation liquid 104 allows vapor 113 from the distillation liquid to travel up to the ceiling (inner surface) to be condensed there forming condensate droplet 114.

A set of condensate-collecting ducts 107 are provided and are located around the solarhouse walls below the level of the ceiling 105 and preferably just below the point of intersection of the walls and ceiling. The condensate-collecting ducts form a narrow channel or gutter for collecting condensate 114 that forms from the condensation of distillation liquid vapor 113 at the ceiling and then runs down the ceiling toward the walls. At least one condensate collecting tube 108 is provided in communication with the condensate-collecting ducts 107 and one or more condensate tanks 109, linking the condensate collecting ducts to the condensate tank. The solarhouse system also includes at least one source liquid inlet 110 and at least one adjustable liquid outlet 111 passing through the walls of the solarhouse system. The inlet and outlet are in communication with the distillation liquid 104 within the solarhouse system. The adjustable liquid outlet 111 is spaced extending from the walls of the solarhouse system up to a height H4 that is higher than the level of the distillation liquid 104. The liquid outlet 111 extended from the distillation chamber is adjustable by the height H4 above the photovoltaic panel.

Figure 2A:
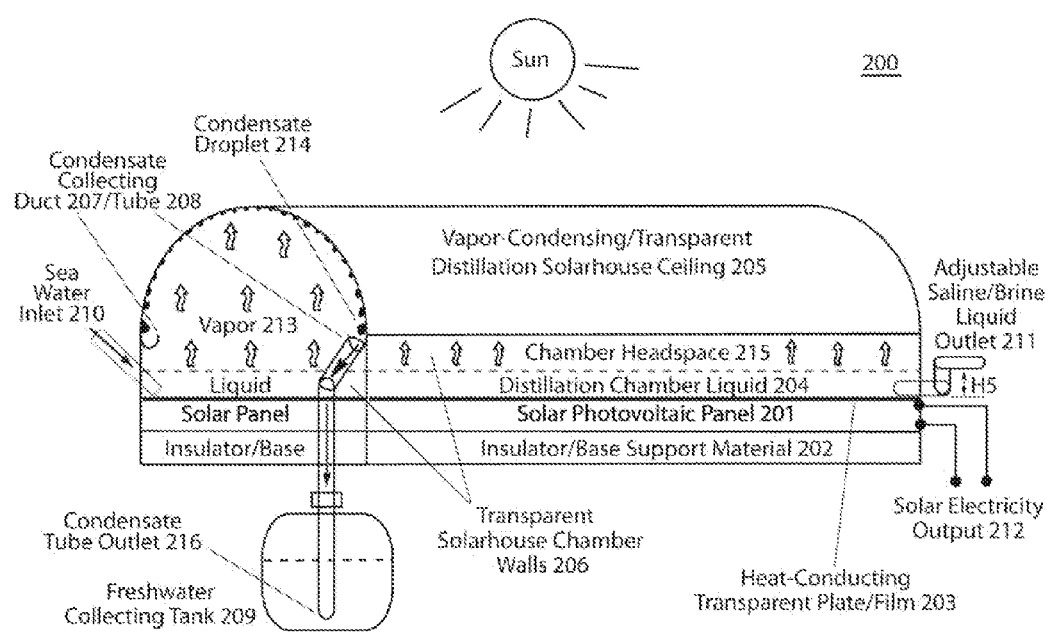
FIG. 2A is a representation of an embodiment of an arch-shaped photovoltaic panel-interfaced solarhouse distillation system in accordance with the present invention as an example of seawater distillation for making freshwater and brine while co-generating solar electricity.

According to another embodiment, a photovoltaic-panel-interfaced distillation solarhouse can be in various forms or shapes including, but not limited to, the form of photobiological growth chambers or growth bags that can be made from various synthetic materials such as certain transparent plastic or polymer materials. As illustrated in FIG. 2A, for example, a photovoltaic panel-interfaced distillation solarhouse system 200 is provided as an arch-shaped distillation liquid chamber system. This solarhouse system includes a sealed distillation liquid chamber system that includes a bottom- or back-insulated solar photovoltaic panel 201 mounted on an insulator base 202 constructed of a support material. The photovoltaic panel is in communication with solar electricity output terminals 212 for harvesting the electrical energy generated. These terminals can be in communication with an electrical load or a storage source such as one or more batteries. A heat-conducting transparent protective plate or film 203 is provided interfacing in between the photovoltaic panel 201 front surface and the distillation chamber liquid 204. The solarhouse system also includes an arch-shaped or curved vapor-condensing transparent ceiling 205 constructed from a transparent material such as transparent plastic cover and forming the top of the solarhouse system and a plurality of walls 206 forming the sides of the solarhouse system and supporting the transparent ceiling 205. Suitable materials for the walls 206 include, but are not limited to, liquid-tight and air-tight sealing materials, e.g., transparent plastic film. The distillation chamber is formed by the heat-conducting transparent protective plate or film 203 (on top of the photovoltaic panel 201 front surface) as the chamber's bottom, the walls 206 as the chamber's sides, and the arch-shaped or curved vapor-condensing transparent ceiling 205 as the chamber's top. The headspace 215 within the distillation chamber above the distillation liquid 204 allows vapor 213 from the distillation liquid sea water to travel up to the ceiling (inner surface) to be condensed there forming condensate droplet 214.

A set of condensate-collecting ducts 207 are provided and are located around the solarhouse walls below the level of the ceiling 205 and preferably just below the point of intersection of the walls and ceiling. The condensate-collecting ducts form a narrow channel or gutter for collecting condensate 214 that forms as distillation liquid vapor 213 condensing at the ceiling and then runs down the ceiling toward the walls. At least one condensate collecting tube 208 is provided in communication with the condensate-collecting ducts 207 and one or more condensate tanks 209, linking the condensate collecting ducts to the condensate tank. A condensate tube outlet 216 is extended into the condensate tank 209. The solarhouse system also includes at least one source liquid inlet 210 and at least one adjustable liquid outlet 211 passing through the walls of the solarhouse system. The inlet and outlet are in communication with the distillation liquid 204 within the solarhouse system. The adjustable liquid outlet 211 is spaced extending from the walls of the solarhouse system up to a height H5 that is higher than the level of the distillation liquid 204. The liquid outlet 111 from the distillation chamber is adjustable by the height H5 above the photovoltaic panel. As illustrated, the liquid inlet 210 is a sea water or saline water inlet, and the collecting tank 209 is a freshwater collecting tank that collects the condensate 214 as freshwater ultimately from the sea water or nonpotable water.

In other words, the arch-shaped distillation liquid chamber system (FIG. 2A) comprises: a) a base support 202 comprising an insulator material, the photovoltaic panel 201 in contact with the base support 202; b) a heat-conducting transparent protective plate 204 covering the photovoltaic panel 201 opposite the base support, the heat-conducting transparent protective plate 203 disposed between the photovoltaic panel 201 and the distillation liquid 204; c) a plurality of walls 206 extending up from the base support 202, the photovoltaic panel 201 and distillation liquid 204 contained with the plurality of walls 206; d) an arch-shaped vapor-condensing transparent ceiling 205 in contact with the plurality of walls 206 opposite the base support 206, thereby the heat-conducting transparent protective plate 203 covering the photovoltaic panel on the base support, plurality of walls 206 and vapor-condensing transparent ceiling 205 together forming a liquid-tight and air-tight distillation chamber containing the distillation liquid, and the vapor-condensing transparent ceiling 205 comprising an arched shape; e) a condensate-collecting duct system 207 in contact with the plurality of walls 206 at an intersection between the plurality of walls and the vapor-condensing transparent ceiling; f) a condensate collecting tube 208 having a first end in contact with the condensate-collecting duct system 207 and a second end 216 in fluid communication with the first end; g) a condensate tank 209 in contact with the second end of the condensate collecting tube; h) a source liquid inlet 210 passing through the plurality of walls 206 and in communication with the distillation chamber; and i) an adjustable liquid outlet 211 passing through the plurality of walls 206 and in communication with the distillation liquid 204.

Another exemplary embodiment of a modified photovoltaic-panel-interfaced solarhouse 1200 is illustrated (FIG. 2B) that can be used for solar distillation while co-generating solar electricity at many places including leveled fields and slope hill sides where solarhouses are installed preferably with a tilted angle to face sunlight. This solarhouse system 1200 uses a layer of hydrophilic transparent material wettable with distillation liquid 1204 under the chamber headspace 1215 in a sealed distillation liquid chamber system that includes a bottom- or back-insulated solar photovoltaic panel 1201 mounted on an insulator base 1202 constructed of a support material. The use of a layer of hydrophilic transparent material wettable with distillation liquid 1204 on solar panel 1201 surface ensures that the distillation liquid will fully cover the solar panel surface favorable for distillation even when the solarhouse is unleveled or tilted against the horizontal line with respective to the gravity. According to one of the various embodiments, it is the hydrophilicity and the capillary effects of the wettable transparent materials that can keep certain distillation liquid on the solar panel surface against gravity even when the left end of solarhouse is lift up significantly higher than its right end until to a completely vertical position. The wettable transparent materials that can be used for this application include (but not limited to): hydrophilic transparent polymer materials (e.g., hydrophilic acrylate or methacrylate polymer), super-hydrophilic and transparent thin films of $TiO_2$ nanotube arrays, transparent hydrophilic $TiO_2$ thin film, hydrophilic sol-gel derived $SiO_2$/$TiO_2$ transparent thin film, polyalcohol diepoxide, polyvinylpyrrolidone and polydimethacrylamide-copolymers with polymerizable α-unsaturated groups plus polyisocyanates and anionic surfactants, hydrophilic polyacrylic acid network-structured materials, hydrophilic transparent resin, transparent hydrophilic paint, hydrophilic glass fibers, hydrophilic glass beads, hydrophilic transparent gel materials, hydrophilic organic transparent gel, hydrophilic cellulose thin (transparent) film, hydrophilic transparent plastic fibers, porous poly(methyl methacrylate) films, Ti-containing mesoporous silica thin films, porous transparent hydrophilic plastic films, and combinations thereof.

The other components of the modified photovoltaic-panel-interfaced solarhouse 1200 (FIG. 2B) is similar to those of FIG. 2A. Briefly, the photovoltaic panel is in communication with solar electricity output terminals 1212 for harvesting the electrical energy generated. These terminals can be in communication with an electrical load or a storage source such as one or more batteries. A heat-conducting transparent protective plate or film 1203 is provided interfacing in between the photovoltaic panel 1201 front surface and the wettable transparent material 1204. The solarhouse system also includes an arch-shaped or curved vapor-condensing transparent ceiling 1205 constructed from a transparent material such as transparent plastic cover and forming the top of the solarhouse system and a plurality of walls 1206 forming the sides of the solarhouse system and supporting the transparent ceiling 1205. Suitable materials for the walls 1206 include, but are not limited to, liquid-tight and air-tight sealing materials, e.g., transparent plastic film. The distillation chamber is formed by the heat-conducting transparent protective plate or film 1203 (on top of the photovoltaic panel 1201 front surface) as the chamber's bottom, the walls 1206 as the chamber's sides, and the arch-shaped or curved vapor-condensing transparent ceiling 1205 as the chamber's top. The headspace 1215 within the distillation chamber above the hydrophilic transparent material wetted with distillation liquid 1204 allows vapor 1213 from the distillation liquid to travel up to the ceiling (inner surface) to be condensed there forming condensate droplet 1214.

Figure 2B:
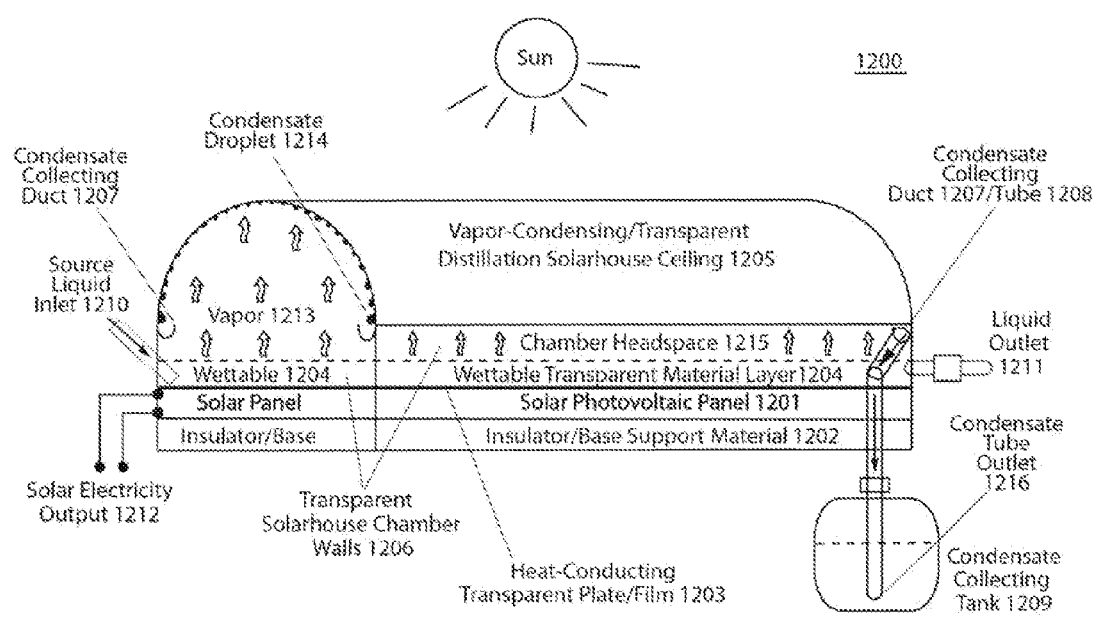
FIG. 2B is a representation of an embodiment in using a layer of wettable transparent material in a photovoltaic panel-interfaced solarhouse distillation system for generating solar electricity and distillation products at many places including leveled fields, hill sides, roofs and walls facing sunlight.

According to one of the various embodiments, a distillation chamber system such as the arch-shaped distillation chamber system shown in FIG. 2B is built largely from liquid-tight and air-tight sealing plastic materials such as transparent plastic film that are flexible. Such a liquid-tight and air-tight distillation liquid chamber can be readily erected and maintain its erected shape using a positive inside air pressure such as by blowing in certain amount of air into the distillation chamber. Use of this internal air pressure approach enables erection of a plastic film-made distillation chamber system such as the arch-shaped distillation chamber system (FIG. 2B) without requiring any additional structural material to support the weight of the distillation chamber ceiling system. Therefore, in one of the various embodiments, it is a preferred practice to erect a plastic film-made distillation chamber system and maintain its erected shape for distillation operation by use of a positive inside air pressure.

A set of condensate-collecting ducts 1207 are provided and are located around the solarhouse walls below the level of the ceiling 1205 and preferably just below the point of intersection of the walls and ceiling. The condensate-collecting ducts form a narrow channel or gutter for collecting condensate 1214 that forms as distillation liquid vapor 1213 condensing at the ceiling and then runs down the ceiling toward the walls. At least one condensate collecting tube 1208 is provided at distillation chamber's right end (above liquid outlet 1211) in communication with the condensate-collecting ducts 1207 and one or more condensate tanks 1209, linking the condensate collecting ducts to the condensate tank. A condensate tube outlet 1216 is extended into the condensate tank 1209. The solarhouse system also includes at least one source liquid inlet 1210 and at least one adjustable liquid outlet 1211 passing through the walls of the solarhouse system. The inlet and outlet are in communication with the hydrophilic transparent material wetted with distillation liquid 1204 within the solarhouse system. If/when the solarhouse is tilted by lifting up its left end to a height significantly higher than that of its right end, the source liquid 1210 can flow down along the wettable transparent material 1204 which temporarily retains the liquid on the hot solar panel surface beneficial for distillation. The condensate from the distillation, in this case, will slide down along the 1205 ceiling inside surface and the collecting duct system to the condensate collecting tube 1208 and to tank 1209 at solarhouse's right end for condensate harvesting while co-producing solar electricity. This designer flexibility in placing a photovoltaic-panel-interfaced solarhouse in any desired angle can often help to maximally capture sunlight on the Earth surface. This feature also enables deployment of the photovoltaic-panel-interfaced solarhouse technology at many places including on level fields, on slope hill sides, and on certain roofs and walls of buildings facing sunlight to provide both solar electricity and distillation products.

Figure 2C:
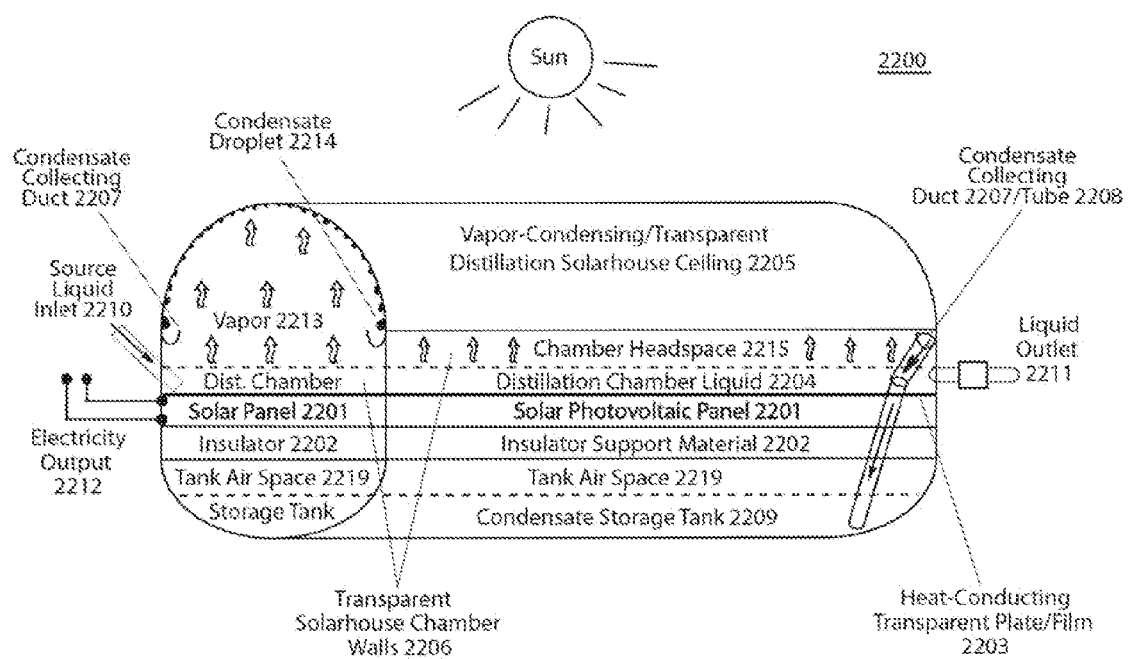
FIG. 2C is a representation of an embodiment in using a tank air space as a floatation mechanism in an air-erectable and floatable photovoltaic panel-interfaced solarhouse distillation system for co-generating solar electricity and distillation products on water, sea surface, and/or on lands and roof tops.

In accordance with another embodiment as illustrated in FIG. 2C, for example, an air-erectable and floatable photovoltaic panel-interfaced solarhouse distillation system 2200 is provided for generating solar electricity and distillation products on Earth water body surface such as pond, river, lake and/or sea surface. This system is similar to that of FIG. 2A except that this embodiment uses a condensate storage tank 2209 and its associated tank air space 2219 to provide buoyancy as a floatation mechanism so that the system floats on water surface such as pond and sea surface. This air-erectable and floatable photovoltaic panel-interfaced solarhouse distillation system (FIG. 2C) can be used also on lands and roof tops for co-generating solar electricity and distillation products as well.

Figure 2D:
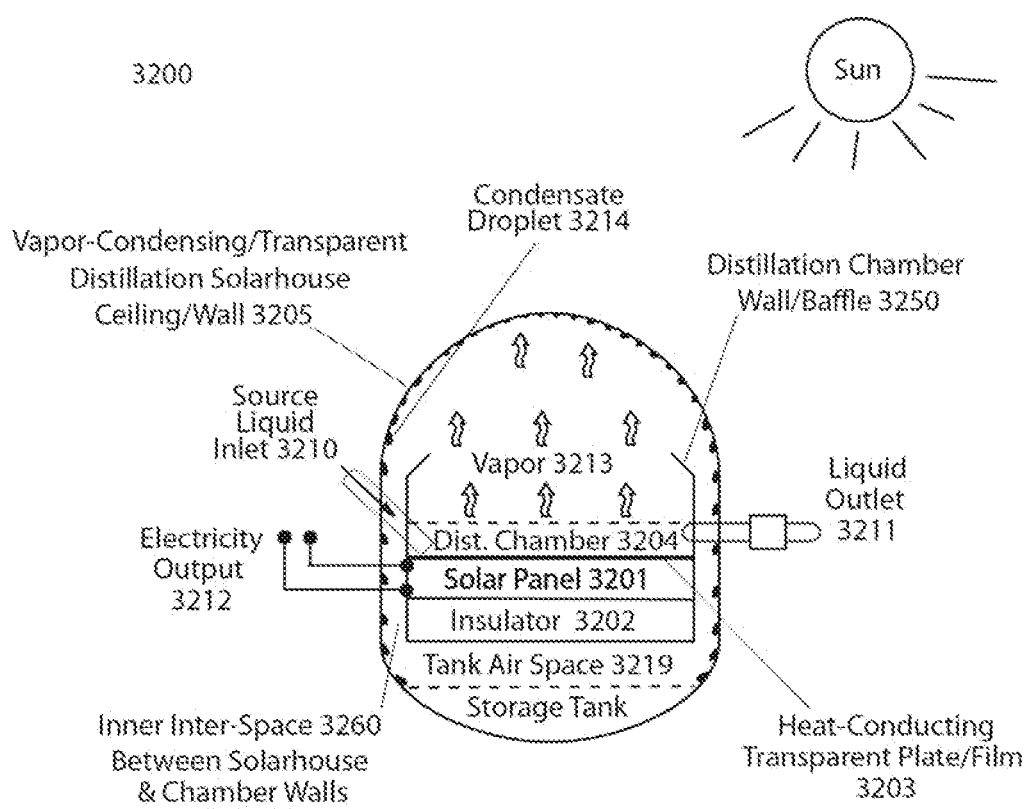
FIG. 2D presents a front view of an embodiment of an air-erectable and floatable photovoltaic panel-interfaced solarhouse distillation system using a tank air space and inner inter-spaces between distillation chamber wall and solarhouse outer wall for co-generating solar electricity and distillation products on water, sea surface, and/or on lands and roof tops.

In accordance with another embodiment as illustrated in FIG. 2D, for example, an air-erectable and floatable photovoltaic panel-interfaced solarhouse distillation system 3200 for co-generating solar electricity and distillation products on water and/or sea surface comprises: an erectable and floatable distillation solarhouse containing a photovoltaic panel-based distillation chamber 3204 with its top open (mouth) to allow vapor 3213 to reach the outer vapor-condensing and transparent distillation solarhouse wall and ceiling 3205 (also as the storage tank/tank air space 3219 wall and ceiling); a transparent wall and splash-resistant baffle 3250 around the chamber 3204 mouth to prevent the distillation liquid from spilling out into the condensate storage tank; a tank air space 3219 that imparts buoyancy as part of a floatation mechanism and separates the bottom-insulated photovoltaic panel (3201 with insulator 3202) from condensate storage tank liquid; and an inner inter-space 3260 between the distillation chamber wall/baffle 3250 and the outer solarhouse (also as the condensate storage tank) wall 3205 to allow condensate droplets 3214 to slide from the storage tank ceiling and wall 3205 (also as the outer solarhouse ceiling and wall) down into the condensate storage tank.

This embodiment (FIG. 2D) is similar to the embodiment illustrated in FIG. 2C and shares many common structures with that embodiment. The unique features of this embodiment 3200 (FIG. 2D) are: (1) the condensate storage tank is also the outer distillation solarhouse comprising a plurality of walls and a ceiling 3205; and (2) this system uses an inner inter-space 3260 (between the distillation chamber wall and the condensate storage tank/solarhouse outer wall) through which the condensate droplets 3214 can flow along the inner surfaces of the solarhouse ceiling and walls 3205 directly into the condensate storage tank/tank air space 3219 without requiring the use of any condensate collection ducts and tubes. According to one of the various embodiments, the inner inter-space 3260 is preferably to be an opening of about 2-20 mm (between the distillation chamber wall and the solarhouse wall) so that the condensate droplets 3205 from the inner surface of the distillation ceiling/wall can readily flow down through the opening into the condensate storage tank at the bottom. Furthermore, the distillation chamber in this embodiment is largely open at its top mouth and a set of tilted baffle 3250 is used around the chamber mouth to prevent distillation liquid from spilling out into the condensate storage tank. Therefore, this system 3200 can be employed for making distilled water while co-generating electricity on water and/or sea surface even if there are waves and tides. Although it is designed for use on water, the embodiment system 3200 can be used also on lands and roof tops as well. FIG. 2D presents a front view of the air-erectable and floatable photovoltaic panel-interfaced solarhouse distillation system using a condensate storage tank, its tank air space, and an inner inter-spaces between distillation chamber wall and sugarhouse (outer) wall for co-generating solar electricity and distillation products on water, sea surface, and/or on lands and roof tops as well.

Figure 3:
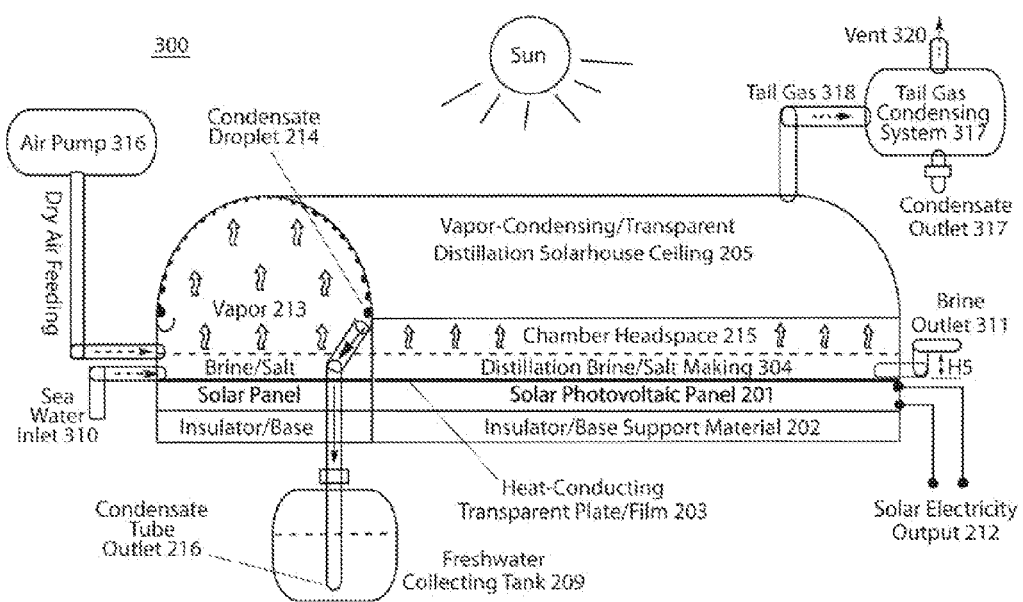
FIG. 3 is a representation of an embodiment of a photovoltaic panel-interfaced solarhouse distillation system in accordance with the present invention equipped with a flexible dry air pump and a tail gas condensing/vent system as an example of seawater distillation for making freshwater and sea salt while co-generating solar electricity.

In accordance with another embodiment as illustrated in FIG. 3, for example, a photovoltaic panel-interfaced distillation solarhouse system 300 is provided as an arch-shaped distillation liquid chamber system. This embodiment is similar to the embodiment illustrated in FIG. 2A and shares many common structures with that embodiment. In addition, this embodiment includes a sea water inlet 310 that introduces sea water or brine into a brine salt-making distillation liquid 304 of the system and a brine outlet 311 to remove the concentrated or used residual brine. The system also includes a flexible air pump feeding system 316 in communication with the brine salt-making distillation liquid and the vapor 213 space (also as the chamber headspace 215) above the distillation liquid to provide for dry air feeding into the system. A tail gas condensing system 317 is provided having a tail gas exit pipe 318 passing through the ceiling 205 in communication with the distillation chamber headspace 215, a condensate outlet 319 and a vent 320. The tail gas condensing unit collects vapor from the vapor headspace 215 above the distillation liquid, condenses and collects the water and vents the gases or air.

The distillation solar-greenhouse/chambers can be built from a number of materials including, but not limited to, glass, transparent plastics and polymer materials. As shown in FIG. 1, a heat-conducting transparent protective plate or film 103, for example a transparent plastic film or membrane, preferably with anti-reflection materials, is placed on top of the photovoltaic-panel 101 front surface, i.e., solar heat source, to interface with the distillation chamber liquid 104, which acts as an immediate heat sink. This heat-conducting transparent plate or film 103 separates and protects the photovoltaic panel 101 from the distillation chamber liquid 104 while allowing both sunlight and heat conduction to pass through to the photovoltaic panel. In one embodiment, the heat-conducting but electrically insulating transparent plate or film membrane 103 is made from a plurality of thermally conductive transparent materials selected from the group consisting of colorless, i.e., clear, transparent plastics, for example, Acrylic (polymethlamethacrylate), Butyrate (cellulose acetate butyrate), Lexan (polycarbonate), and PETG (glycol modified polyethylene terphthalate), polypropylene, polyethylene, and polyethylene HD, thermally conductive transparent plastics, colorless and transparent conductive paint, colorless glass, borosilicate glass such as Pyrex glass, sol-gel, silicone rubber, quartz mineral, transparent cellulose nanofiber/epoxy resin nanocomposites, glass-ceramic materials, transparent ceramics, clear transparent plastics containing anti-reflection materials and/or coating, clear glass containing anti-reflection materials or coatings and combinations thereof.

In accordance with any of the embodiments illustrated herein, certain clear transparent plastics films or membranes are used to make an entire distillation liquid chamber including its bottom wall interfacing with the photovoltaic panel front (top) surface. Although some of these transparent materials may have certain limited thermal conductivity, they or their combination can be used to make a relatively thin plate, film or membrane so that it can conduct heat at a reasonable rate with little heat buildup in the photovoltaic panel. The distillation liquid serves as an immediate heat sink that utilizes the solar waste heat to vaporize the liquid for distillation.

Heat buildup in the electronic components of a photovoltaic panel can severely limit service life and reduce operating efficiency. Use of certain injection moldable and extrudable heat-conducting transparent plastic compounds known as thermally conductive plastics can also provide significant benefits in solar waste heat management and utilization in accordance with exemplary embodiments of the present invention. Certain heat conductive transparent plastics are specially made by compounding certain heat conductive fillers, for example certain transparent ceramics, with polymers. The added heat-conducting fillers eliminate hot spots in components by spreading out the heat more evenly than unfilled plastics. Their inherently low coefficient of thermal expansion lowers their shrink rates and helps replace certain metals, glasses, and ceramics in dimensionally critical parts. Other advantages of the materials include design flexibility, corrosion and chemical resistance and reduction of secondary finishing operations in manufacturing of the photovoltaic-panel-interfaced solar-greenhouse distillation systems.

In one embodiment, the heat-conducting transparent plate, film or membrane is made from a wide range of heat-conducting transparent materials that are selected from the group consisting of colorless glass, borosilicate glass, Pyrex glass, sol-gel, silicone rubber, quartz mineral, transparent cellulose nanofiber/epoxy resin nanocomposites, glass-ceramic, transparent ceramics and combinations thereof. Many of the commercially available photovoltaic panels or modules often have a sheet of protective glass on the front, i.e., sun up, side, allowing light to pass while protecting the semiconductor wafers from environmental elements such as rain, hail and dusts. Therefore, many of the commercially available photovoltaic panels can be used to serve as the base of a distillation liquid chamber for construction of certain solar-greenhouse distillation systems as well without the use of an additional heat-conducting transparent plate. However, application of an additional protective heat-conducting transparent plate or film with special surface properties such as non-sticking, anti-reflection, e.g., silicon nitride or titanium dioxide, and chemical resistance properties as well as resistance to mechanical damage provides added benefits for certain solarhouse distillation operations such as the making of sea salt from seawater while co-generating solar electricity as illustrated, for example, in the embodiment of FIG. 3.

In one embodiment, the transparent vapor-condensing solarhouse ceiling is made from a number of transparent materials selected from the group consisting of colorless or clear transparent plastics, such as Acrylic (polymethylamethacrylate), Butyrate (cellulose acetate butyrate), Lexan (polycarbonate), and PETG (glycol modified polyethylene terephthalate), polypropylene, polyethylene (or polyethene) and polyethylene HD, thermally conductive transparent plastics, colorless and transparent conductive paint, colorless glass, borosilicate glass, Pyrex glass, sol-gel, silicone rubber, quartz mineral, transparent cellulose nanofiber/epoxy resin nanocomposites, glass-ceramic materials, transparent ceramics, clear transparent plastics containing certain anti-reflection materials or coatings, clear glass containing certain anti-reflection materials or coatings and combinations thereof.

According to one embodiment, an insulating base support material is preferably used on the back or bottom of the photovoltaic panel. This material can also be used on certain side walls of the system and generally lessens the heat loss through conduction. Suitable insulation materials include, but are not limited to, polyurethane foam, Styrofoam and mineral wool. In addition, alternative insulating foam and materials can also be used including, but not limited to, biomass fibers, softwoods, straw insulation and mineral fiber insulating materials like vermiculite, glass wool, rock wool, glass fiber or fiberglass. Typical frame structure materials include, but are not limited to, plastic materials, fiberglass-reinforced plastic materials, carbon fiber composite materials, vinyl ester, epoxy materials, wood, aluminum, steel and combinations thereof.

According to one embodiment, the photovoltaic panels include, but are not limited to, semiconductor photovoltaic panels made from monocrystalline silicon, polycrystalline silicon, amorphous silicon, cadmium telluride, copper indium selenide/sulfide and combinations thereof. A wide variety of solar photovoltaic cells are suitable for use with exemplary embodiments of the present invention. The applicable solar photovoltaic cells panels include, but are not limited to, thin film solar cell panels, e.g., such as silicon thin-film cells panels, cadmium telluride photovoltaic panels, copper indium gallium selenide solar cell panels, multijunction photovoltaic cell panels, e.g., the GaAs based multijunction devices and the triple junction GaAs solar cells panels, dye-sensitized solar cells panels, organic/polymer solar cells panels, photovoltaic shingles, photovoltaic paint panels, and combinations thereof.

In one embodiment, use of solar photovoltaic panel-interfaced distillation solarhouse systems can perform distillation for a number of liquids including, but not limited to, seawater, brackish water, saline water, brine liquid, surface water, groundwater, well-water, nonpotable water, photobiological liquid culture media, beer, methanol solutions, ethanol solutions, propanol (e.g., n-propanol and/or isopropyl alcohol) solutions, 1-hydroxy-2-propanone solutions, butanol (including n-butanol, isobutanol, sec-butanol, and/or tert-butanol) solutions, cyclohexanol solutions, tert-amyl alcohol, pentanol solutions, hexadecan-1-ol solutions, polyhydric alcohols [e.g., ethane-1,2-diol (Ethylene Glycol), propane-1,2,3-triol (Glycerin), butane-1,2,3,4-tetraol (Erythritol), pentane-1,2,3,4,5-pentol (Xylitol), hexane-1,2,3,4,5,6-hexyl (Mannitol, Sorbitol), heptane-1,2,3,4,5,6,7-heptol (Volemitol), solutions, unsaturated aliphatic alcohols, e.g., prop-2-ene-1-ol (Allyl Alcohol), 3,7-dimethylocta-2,6-dien-1-ol (Geraniol), prop-2-in-1-ol (Propargyl Alcohol)] solutions, alicyclic alcohols [e.g., cyclohexane-1,2,3,4,5,6-geksol (Inositol), 2-(2-propyl)-5-methyl-cyclohexane-1-ol (Menthol)] solutions, primary alcohol solutions, higher alcohols solutions, aldehyde solutions, aldehyde hydrate solutions, carboxylic acids solutions, lactose solutions, biomass-derived hydrolysate solutions, glucose solutions, fructose solutions, sucrose solutions, furanose solutions, pyranose solutions, monosaccharides, such as trioses, tetroses, pentoses, and hexoses, solutions, oligosaccharides solutions, polysaccharides solutions, acetic acid solutions, propionic acid solutions, citric acid solutions, lactic acid solutions, acetone solutions, and other organic solutions or solvents and combinations thereof.

In operation of the embodiments of the solarhouse distillation systems of the present invention, a distillation source liquid is introduced through the inlet and into an area or chamber located immediately above and/or below a solar photovoltaic panel, providing thermal contact through the heat-conducting transparent plate or film with the photovoltaic panel. As shown in one of the various embodiments of the present invention, the bottom surface of the heat-conducting transparent plate or film is preferably in direct physical contact with the front (top) surface of the photovoltaic panel, while the top surface of the heat-conducting transparent plate or film is in contact with the distillation liquid. As a result, as sunlight or solar radiation passes through the heat-conducting transparent film or plate to drive photovoltaic electricity generation with co-production of heat at the photovoltaic panel, the solar heat co-produced from the photovoltaic panel is transferred through a nearly one-dimensional heat conduction/flow across the heat-conducting transparent film or plate into the distillation liquid above the photovoltaic panel. Subsequently, the transferred heat vaporizes the distillation liquid. This vapor rises in the chamber headspace and condenses onto the vapor-condensing transparent tilted or arched ceiling that is cooled by air, winds and thermo infra-red radiation to the ambient environment or outer space.

Figure 4:
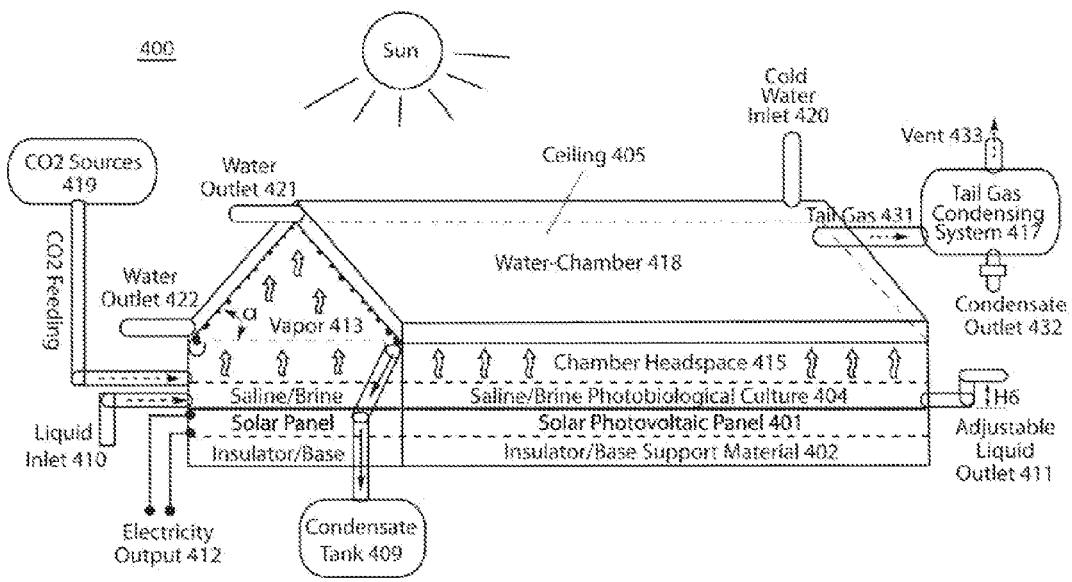
FIG. 4 is a representation of an embodiment of a multifunctional photovoltaic panel-interfaced solar-greenhouse distillation system in accordance with the present invention using a cooling water-chamber ceiling system, a flexible $CO_2$ feeding source, and a tail gas condensing/vent system for making saline/brine photobiological culture and greenhouse distillation while generating solar electricity.

Referring to FIG. 4, another exemplary embodiment of a photovoltaic panel-interfaced distillation solarhouse system 400 in accordance with the present invention is illustrated. The photovoltaic panel-interfaced distillation solarhouse system is a sealed distillation liquid chamber system that includes a bottom- or back-insulated solar photovoltaic panel 401 mounted on an insulator base 402 constructed of a support material. The photovoltaic panel is in communication with solar electricity output terminals 412 for harvesting the electrical energy generated. These terminals can be in communication with an electrical load or a storage source such as one or more batteries. A heat-conducting transparent protective plate or film is provided interfacing in between the photovoltaic panel 401 front surface and the distillation chamber liquid 404, which as illustrated is saline or brine distillation liquid or saline and/or brine photobiological culture, e.g., algal culture. The solarhouse system also includes a tilted or angled vapor-condensing transparent ceiling 405 constructed from a transparent material such as transparent plastic cover and forming the top of the solarhouse system and a plurality of walls forming the sides of the solarhouse system and supporting the transparent ceiling 405. The liquid distillation chamber is formed by the heat-conducting transparent protective plate or film (on top of the photovoltaic panel 401 front surface) as its bottom surface, the solarhouse walls as its side walls, and the tilted or angled vapor-condensing transparent ceiling 405 as its top. The headspace 415 within the distillation chamber above the distillation liquid 404 allows vapor 413 from the distillation liquid to travel up to the ceiling (inner surface) to be condensed there forming condensate droplet.

A set of condensate-collecting ducts are provided and are located around the solarhouse walls below the level of the ceiling 405 and preferably just below the point of intersection of the walls and ceiling. The condensate-collecting ducts form a narrow channel or gutter for collecting condensate that forms as distillation liquid vapor 413 condensing at the ceiling and runs down the ceiling toward the walls. At least one condensate collecting tube is provided in communication with the condensate-collecting ducts and one or more condensate tanks 409, linking the condensate collecting ducts to the condensate tank. The solarhouse system also includes at least one source liquid inlet 410 and at least one adjustable liquid outlet 411 passing through the walls of the solarhouse system. The inlet and outlet are in communication with the distillation liquid 404 within the solarhouse system. The adjustable liquid outlet extends from the walls of the solarhouse system up to a height H6 that is higher than the level of the distillation liquid 404. The liquid outlet 411 extended from the distillation chamber is adjustable through the height H6 above the photovoltaic panel.

The system 400 also includes a $CO_2$ source feeding system 419 in communication with the distillation liquid and the vapor space above the distillation liquid to provide for $CO_2$ gas feeding into the system. A tail gas condensing system 417 is provided having a tail gas exit pipe 431 passing through the ceiling 405 in communication with the distillation chamber vapor headspace 415, a condensate outlet 432 and a vent 433. The tail gas condensing unit collects vapor from the distillation chamber vapor headspace above the distillation liquid, condenses and collects the water and vents the vapor-removed gases.

In this embodiment, the vapor-condensing transparent ceiling 405 is actively cooled by running cold water through a water-chamber system 418 disposed on top of the ceiling 405. At least one cold water inlet 420 is provided to introduce cold water at the desired temperature into the water-chamber 418. The cold water that is circulated through the water-chamber 418 is collected through a plurality of water outlets 421, 422. Depending on the surface property of the ceiling material, the tilted-ceiling angle α should be at least above about 5 degrees, preferably about 15 degrees to about 30 degrees, and more preferably about 30 degrees to about 70 degrees at all inner surface areas of the ceiling to prevent condensate droplets from free falling from the ceiling surface back into the distillation liquid 404 below. In this way, as the vapor 413 condenses at the ceiling, the condensate droplets slide downwards along the inner surface of the tilted ceiling 405 and finally flow into the collecting ducts around the solarhouse (distillation chamber) wall by use of the surface tension and the force of gravity. The collected condensate is then transported through a condensate-transferring tube by use of gravity to the storage tank 409. Alternatively, the condensate is passed in series to another distillation solarhouse for re-distillation as is illustrated in subsequent embodiments until the desired results are achieved with the final distillate(s).

In general, a significant amount, for example, nearly about 85%, of the sunlight energy is dissipated as heat at a solar photovoltaic panel. This solar waste heat can be used to raise the temperature of the distillation chamber liquid to a range of about 30° C. to about 70° C., depending on the geographic locations and seasonal variations. This heat and the resultant temperature are sufficient to vaporize many volatile substances or solvents such as ethanol and water from the distillation chamber. The vapor is condensed onto the inner surface of the solarhouse's ceiling which is transparent and can be cooled actively or passively by the ambient air and winds, and by thermo infra-red radiation to the ambient environment. As the vapor condenses, the condensate grows into small droplets that slide downwards along the inner surface of the tilted or arched ceiling and flow into the collecting ducts around the solarhouse wall under the forces of surface tension (ceiling surface-condensate droplet interaction) and gravity. For certain volatile substances such as ethanol, its concentration in the condensate is significantly higher than that in a distillation source beer liquid (typically 0.1-10% ethanol), because the ethanol-to-water ratio in the vapor is usually greater than that in the liquid medium. Therefore, use of the systems in accordance with the present invention enables harvesting of volatile substances such as ethanol from a distillation source liquid using solar waste heat while co-producing solar electricity.

When a volatile solvent such as water or an organic solvent, e.g., ethanol or methanol, is removed from the solar distillation liquid by evaporation, non-volatile solutes, including salt and sugar, remain in the solarhouse distillation chamber. Consequently, as the photovoltaic panel-interfaced evaporation/distillation process progresses, the concentration of the non-volatile solute increases until a point of solute saturation and resultant precipitation. Therefore, the solar photovoltaic panel-interfaced distillation technology also concentrates and harvests nonvolatile substances.

Heat generated from the photovoltaic panels raises the temperature of the distillation liquid to as high as about 30-70° C. Therefore, in one embodiment, heat-tolerant photovoltaic panels are used for simultaneous solar electricity generation and solar heat-driven distillation for maximal energy efficiency and production benefits. For certain sunlight-concentrating photovoltaic panel-interfaced solarhouse distillation systems, as illustrated, for example, in FIG. 6, which operates above about 100° C., a highly heat-tolerant (HT) solar photovoltaic panel is preferred.

In one embodiment as illustrated in FIG. 4, the photovoltaic-panel-interfaced distillation solar-greenhouse system includes a solar photovoltaic panel-based distillation chamber with the water-chamber 418 attached to and covering the transparent ceiling 405. This cools the ceiling by running cold water through the chamber over the ceiling to enhance the condensation portion of the distillation process. Use of a water-cooled ceiling system also moderates the ambient temperature within the solarhouse so that the photovoltaic panel 401 functions more effectively with a more-favorable operating temperature condition for both solar electricity generation and waste heat utilization through co-operation of the photovoltaic panel and distillation system together.

The embodiment of FIG. 4 also represents an example of dual-function solar-greenhouse system that can be used both as a photovoltaic panel-based solarhouse system and a photobiological reactor/distillation greenhouse by connecting the system to a $CO_2$ source/feeding system 419 and a tail gas condensing unit 417 for saline or brine photobiological culture distillation liquid 404 and for making freshwater through greenhouse distillation while co-generating solar electricity 412. In this embodiment, the vapor-condensing ceiling is a transparent water-chambered ceiling 405 that is cooled by running cold water through the water chamber 418 that is located over the ceiling 405. Use of the water-cooled ceiling system 418 enhances the distillation process by increasing the rate of vapor condensation at the inner surface of the cooled ceiling. As sunlight drives photovoltaic electricity production with heat generation, the vapor 413 that rises from the distillation liquid carries heat energy to the water-cooled ceiling 405 where it condenses. Therefore, use of the water-cooled ceiling system 418 reduces the temperature of the distillation liquid 404 and the solar panel 401 that is in thermo contact with the distillation liquid to a moderate level, which is favorable to the performance of many solar photovoltaic panels and in particular those that are sensitive to heat for enhanced photovoltaic electricity generation.

Figure 5:
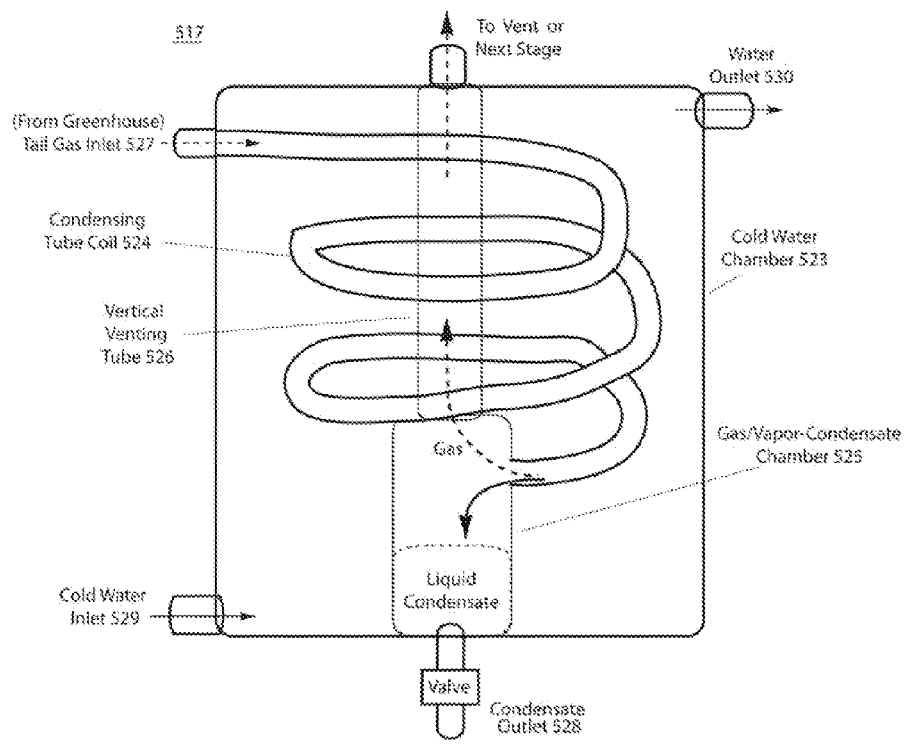
FIG. 5 is a representation of an embodiment of a tail gas condensing/vent unit (system) that comprises a cold-water-bath chamber cooling a tail-gas condensing tube coil, a gas/vapor-condensate chamber, and a vertical venting tube.

Referring to FIG. 5, an embodiment of a tail-gas condensing and venting unit 517 for use in the photovoltaic panel-based solarhouse systems of the present invention is illustrated. The tail-gas condensing and venting unit 517 includes a cold-water-bath chamber 523, a tail-gas condensing tube coil 524, a gas/vapor-condensate chamber 525 and a vertical venting tube 526. In operation, the tail-gas condensing tube coil 524, gas/vapor-condensate chamber 525, and vertical venting tube 526 are all cooled by running cold water through the cold-water-bath chamber 523 so that the vapor in the tail gas condenses along the condensing tube coil, which is connected with the gas/vapor-condensate chamber before venting through the vertical venting tube. This embodiment of the tail-gas condensing and venting unit is useful in processing the tail gas from a distillation greenhouse or solarhouse. When tail gas, for example, from a solarhouse or greenhouse, flows through the condensing tube coil 524 that is cooled by the cold water bath 523, its vapor condenses and flows along the condensing tube and into the gas/vapor-condensate chamber 525 where the condensate accumulates at the bottom of the gas/vapor-condensate chamber. The vapor-removed tail gas is then vented through a vertical venting tube 526 connected with the upper part of the tail gas-condensate chamber. The condensate, containing freshwater, is collected through use of the condensate outlet 528 located at the bottom of the unit.

In one embodiment, for example as illustrated in FIG. 2, the use of the photovoltaic-panel-interfaced distillation solar-greenhouse system produces solar electricity 212 and, at the same time, generates freshwater that is collected in the freshwater collecting tank 209 and saline/brine products from the liquid outlet 211 from seawater introduced through the sea water inlet 210. In operation, the distillation source liquid, for example seawater, is initially purified through liquid sedimentation and filtration to remove any undesirable contaminants and particles from the source liquid. A clean source liquid is introduced through an inlet into the solarhouse distillation chamber, and sunlight or solar radiation is used to drive photovoltaic electricity and heat generation in the distillation liquid chamber. The solar waste heat is used to vaporize liquid molecules such as water from the distillation liquid, e.g., seawater. The resulting vapor is condensed onto a tilted or arch-shaped transparent solarhouse ceiling, and the condensate, i.e., the condensed freshwater droplets, are collected as the droplets slide along the inside surfaces of the tilted ceiling system and into condensate-collecting ducts around the wall of the solarhouse under the forces of surface-condensate interaction and gravity. The collected condensate, which is freshwater, is collected from the condensate-collecting ducts through a tube into a freshwater collecting/storage tank. When the solute, e.g., salt, concentration in the distillation liquid reaches a certain pre-determined high level, such as saline/brine, the saline/brine product is harvested through an adjustable saline/brine liquid outlet. These steps can be repeated iteratively for a plurality of operational cycles to achieve more desirable results in terms of electrical power generation, freshwater generation and brine concentration. Therefore, this operational process includes the following specific process steps: a) If/when necessary, pre-purifying distillation source liquid such as seawater through liquid sedimentation and filtration to remove any undesirable matters and particles from the source liquid; b) Introducing clean source liquid through an inlet into solarhouse distillation chamber; c) Using sunlight to drive photovoltaic electricity and heat generation at the distillation liquid chamber; d) Using the solar waste heat to vaporize liquid molecules such as water from the distillation liquid; e) Condensing the vapor onto a tilted (or arch-shaped) transparent solarhouse ceiling; f) Collecting the condensate sliding along the inside surfaces of the tilted ceiling system into condensate-collecting ducts around the wall of the solarhouse by use of surface-condensate interaction and gravity; g) Transporting the collected condensate (freshwater) from the condensate-collecting ducts through a tube into a freshwater collecting/storage tank;

h) When solute (such as salt) concentration in the distillation liquid reaches a certain high level, harvest the saline/brine product through an adjustable saline/brine liquid outlet; and i) repeating steps a) through h) for a plurality of operational cycles to achieve more desirable results in terms of electrical power generation, freshwater generation and brine concentration.

In one embodiment, exemplary processes in accordance with the present invention use the photovoltaic-panel-interfaced distillation solarhouse system for a plurality or series of operational cycles to achieve more desirable results. Any one of the steps a) through i) of this process can be adjusted or modified as desired for certain specific operational conditions. For example, when a distillation solar-greenhouse with a water-cooled vapor-condensing ceiling system is used as illustrated, for example, in FIG. 4, the step e) of vapor condensing can be enhanced by running cold water through the water-chamber ceiling system at the top of the distillation solar-greenhouse. Any one of the steps a) through i) of the process of the present invention can be applied in whole or in part and in any adjusted combination for enhanced solar electricity generation and solvent distillation in accordance of this invention.

Figure 6:
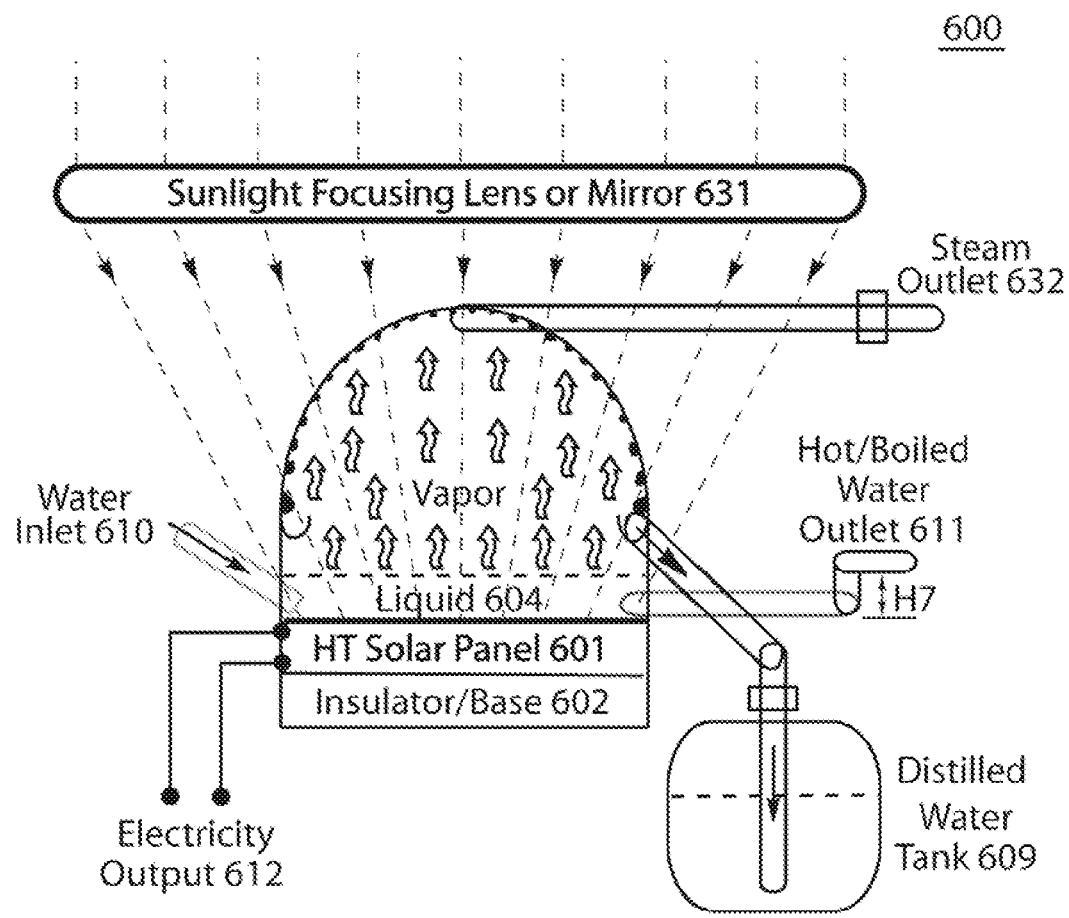
FIG. 6 is a representation of the front view of an embodiment of a sunlight-concentrating photovoltaic panel-interfaced solarhouse distillation system with a sunlight focusing lens/mirror system.

Sunlight-Concentrating Photovoltaic-Panel-Interfaced Solarhouses and Related Systems Referring to FIG. 6, an embodiment of a sunlight-concentrating photovoltaic-panel-interfaced distillation solarhouse system 600 is illustrated. In this embodiment, the system comprises a sunlight focusing lens and/or a mirror system 631, a highly heat-tolerant (HT) photovoltaic panel 601 in contact with and supported by an insulating base 602 and a heat-conducting transparent protective plate or film 603 interfacing in between the photovoltaic-panel 601 front surface and the distillation chamber liquid 604. The photovoltaic panel is in communication with a pair of electrical leads 612. An arch-shaped vapor-condensing transparent ceiling 605 forms the top with liquid- and air-tight-sealing materials forming the walls of the system. A set of condensate-collecting ducts are located around the solarhouse wall below the ceiling level, and a condensate collecting tube is provided that is connected between the condensate-collecting ducts and a condensate tank 609. A source liquid inlet 610 is provided as is an adjustable liquid outlet 611 spaced a height H7 above the photovoltaic panel 601 and a steam outlet 632 in connection with the distillation liquid chamber.

In the embodiment illustrated in FIG. 6, a large area of lenses or mirrors 631 is used to focus or to concentrate sunlight onto photovoltaic panel 601 front surface with a relatively small area (significantly smaller than the large area of lenses or mirrors 631) so that it will generate high power electricity and intense heat. The intense heat can raise the temperature of a distillation liquid such as water quickly to its boiling point, yielding hot steam and distilled water. In addition, the photovoltaic semiconductor properties allow solar cells to operate more efficiently in concentrated light as long as the photovoltaic cell junction temperature is kept cool by a suitable heat sink such as the distillation liquid. Consequently, increasing the sunlight concentration ratio, for example from about 2 to about 20 suns, improves the performance of high efficiency photovoltaic cells.

In one embodiment, the sunlight collecting/focusing lens and/or mirror system collects and concentrates sunlight onto the heat-tolerant (HT) photovoltaic panel in the distillation chamber to generate electricity and intense heat, for example above about 100° C. Due to the use of the sunlight focusing lens/mirror system that can collect and concentrate sunlight onto the photovoltaic panel front surface, the concentrated sunlight intensity on the photovoltaic panel (FIG. 6) is much higher than that without using a sunlight concentrating lens system (FIG. 2). Consequently, the temperature of the sunlight-focusing photovoltaic panel-interfaced distillation chamber (FIG. 6) can be significantly higher than that of embodiments without a sunlight focusing lens/mirror system. For example, when a sunlight focusing lens/mirror system that concentrates sunlight intensity between about 2 and about 20 suns is used, the distillation liquid water can reach its boiling temperature (100° C.) within about 5-30 minutes, depending on the geographic location and weather conditions. Certain sunlight collecting/focusing lens and/or mirror system as powerful as 1000 suns are now commercially available. Use of such powerful sunlight collecting/focusing systems generates high power electricity and very intense heat. To suit with the higher-temperature (>100° C.) operation, high-temperature-tolerant photovoltaic panels and structural materials are used in the construction of sunlight-concentrating photovoltaic-panel-interfaced distillation solarhouse system that use a sunlight-focusing lens/mirror system that collects and concentrates more than 1.5 suns. Therefore, the sunlight-concentrating photovoltaic panel-interfaced distillation chamber system of FIG. 6 can be used to produce boiled water, hot steam and distilled water while co-generating photovoltaic electricity.

Figure 7:
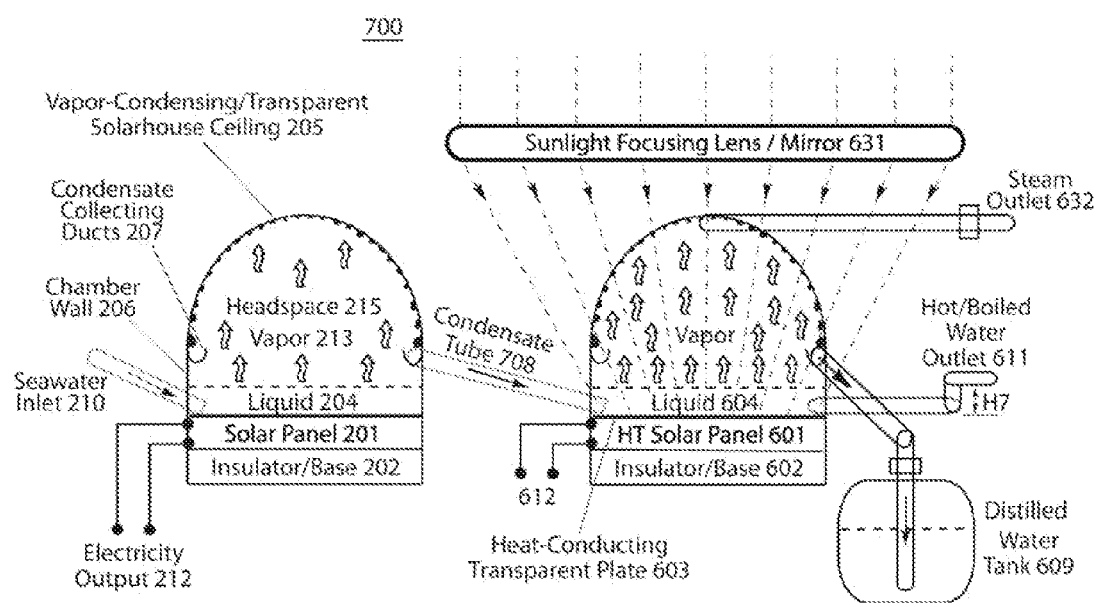
FIG. 7 is a representation of the front view of an embodiment of a lower temperature (<100° C., typically 4-70° C.) photovoltaic panel-interfaced solarhouse seawater distillation system (left) coupled with a sunlight-concentrating higher-temperature (>100° C.) tolerant photovoltaic panel-interfaced solarhouse distillation system (right) for making freshwater, boiled water, hot steam and distilled water while generating solar electricity.

In one embodiment, the higher-temperature sunlight-concentrating photovoltaic panel-interfaced distillation chamber system, for example, of FIG. 6, is used in combination with other embodiments of the solar distillation systems of the present invention for example in a series arrangement. Referring to FIG. 7, an embodiment of a series of solar distillation systems 700 where the system of FIG. 6 is the second system in the series is illustrated. As illustrated, the higher-temperature (>100° C.) sunlight-concentrating photovoltaic panel-interfaced distillation system is used in combination with a freshwater-making photovoltaic panel distillation system. As illustrated, the freshwater-making photovoltaic panel distillation system embodiment of FIG. 2 is used as the first system in the series; however, any embodiment of a fresh-water making system in accordance with the present invention can be used. Freshwater (condensate) made from seawater through the lower-temperature, e.g., <100° C., typically in a range of about 4° C. to about 70° C., photovoltaic panel-based distillation solarhouse system is passed through a condensate tube 708 that is connected as the source liquid feedstock for the higher-temperature (>100° C.) sunlight-concentrating photovoltaic panel-interfaced distillation system. The higher-temperature system in the series is used to make boiled water, hot steam, and distilled water while co-generating high power photovoltaic electricity. Hot steam can be employed for a number of applications including sterilization for photobiological culture media and reactors.

Figure 8A:
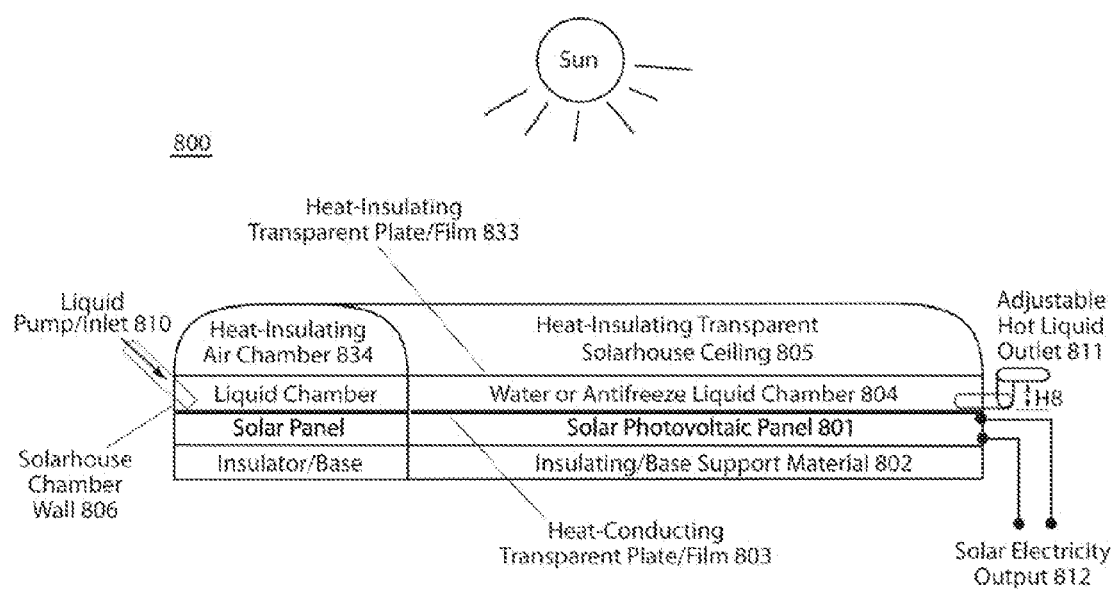
FIG. 8A is a representation of an embodiment of a modified photovoltaic panel-interfaced solarhouse system for making hot liquid such as hot water while generating solar electricity.

According to another embodiment, a photovoltaic-panel-interfaced distillation solarhouse can be flexibly modified to serve other functions such as producing hot liquid and solar electricity. Referring to FIG. 8A, an exemplary embodiment of a modified photovoltaic-panel-interfaced solarhouse 800 is illustrated that is used to produce hot liquid such as hot water while co-generating solar electricity. This modified photovoltaic-panel-interfaced solarhouse system includes a back-insulated heat-tolerant photovoltaic panel 801 mounted on an insulating support base 802 and a flexible heat-conducting transparent protective plate or film 803 interfacing in between the photovoltaic-panel 801 front (top) surface and the water (or antifreeze) liquid chamber 804. A flexible heat-insulating transparent plate or film 833 is provided in between the water (or antifreeze) liquid chamber 804 and the heat-insulating air chamber 834 to separate the two chambers of the system. An arch-shaped heat-insulating transparent ceiling 805, for example, a clear transparent plastic cover, is provided as the top that is supported by heat-insulating liquid-tight and air-tight-sealing materials, such as transparent plastic films as the walls 806. The water (or antifreeze) liquid chamber 804 is formed by the heat-conducting transparent protective plate or film 803 as its bottom, part of the heat-insulating liquid-tight and air-tight-sealing walls 806 as its walls, and the heat-insulating transparent plate or film 833 as its top cover. Whereas, the heat-insulating transparent plate or film 833 and the arch-shaped heat-insulating transparent ceiling 805 together form the heat-insulating air chamber 834 that is located above the water (or antifreeze) liquid chamber 804. The system also includes a source liquid pump/inlet 810, an adjustable hot liquid outlet 811 in connection with the liquid chamber 804 and spaced a height H8 above the photovoltaic panel and a set of electricity output connectors 812. The hot liquid outlet 811 extended from the water (or antifreeze) liquid chamber 804 is adjustable through the height H8 above the photovoltaic panel.

In one preferred embodiment, heat-insulating, as opposed to heat-conducting, transparent materials such as heat-insulating transparent plastics are used in the construction of the ceiling and walls for the hot water-making photovoltaic-panel-interfaced solarhouse embodiment of FIG. 8A. This is in contrast to other embodiments of the photovoltaic-panel-interfaced distillation solarhouse illustrated in FIGS. 1-4 where the solar-greenhouse ceiling is made preferably from certain heat-conducting transparent plastics to serve as a vapor-condensing surface for the purpose of facilitating a distillation application. As shown in FIG. 8A, there is a heat-insulating air chamber 834 located above the water (or antifreeze) liquid chamber 804 to provide more-effective heat-insulation for the modified solarhouse. In operation, when sunlight passes through both the heat-insulating air chamber 834 and the water (or antifreeze) liquid chamber 804 and drives photovoltaic electricity generation, it co-produces heat at the photovoltaic panel. The solar heat co-produced from the photovoltaic panel is transferred through a nearly one-dimensional heat conduction/flow across the heat-conducting transparent film (plate) 803 into the water (or antifreeze) liquid 804 above the photovoltaic panel 801 to produce hot liquid, which may be valuable for both residential and industrial applications.

This modified photovoltaic-panel-interfaced solarhouse (FIG. 8A) can also be applied in combination with a sunlight focusing lens and/or mirror systems, e.g., FIG. 6 at 631, to further enhance the capability of producing hot water while co-generating solar electricity 812.

Figure 8B:
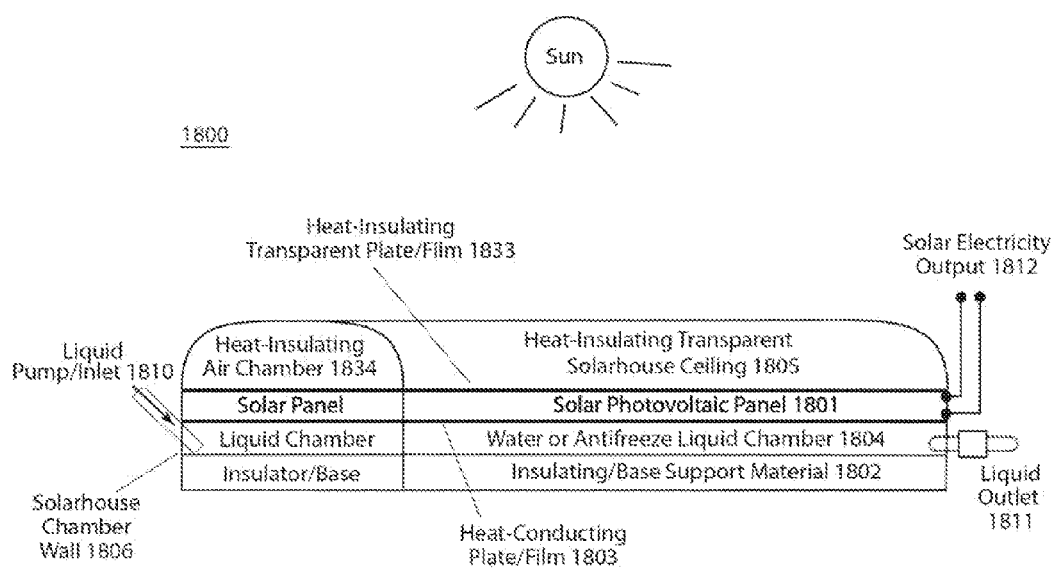
FIG. 8B is a representation of an embodiment of a modified photovoltaic panel-interfaced solarhouse system for making hot liquid while generating solar electricity on leveled fields, slope hill sides, roofs and walls.

As shown in FIG. 8B, another exemplary embodiment of a modified photovoltaic-panel-interfaced solarhouse 1800 with a liquid chamber 1804 constructed immediately beneath the back surface of the photovoltaic panel 1801 is used to produce hot liquid coolant such as hot water or hot antifreeze liquid while co-generating solar electricity. Hot water or hot antifreeze liquid can be used to provide heating for homes and other applications. This modified photovoltaic-panel-interfaced solarhouse system includes a heat-tolerant photovoltaic panel 1801 mounted on top of a water or antifreeze liquid chamber 1804 that is constructed with part of the solarhouse chamber walls in between an insulating support base 1802 and a flexible heat-conducting plate or film 1803 interfacing with the photovoltaic-panel 1801 back (bottom) surface. That is, the water (or antifreeze) liquid chamber 1804 is formed by the heat-conducting plate or film 1803 as its top, part of the heat-insulating liquid-tight and air-tight-sealing walls 1806 as its walls, and the heat-insulating base support material 1802 as its bottom. A flexible heat-insulating transparent plate or film 1833 is provided in between the top surface of the solar photovoltaic panel 1801 and the heat-insulating air chamber 1834 to help retain the solar heat. An arch-shaped heat-insulating transparent ceiling 1805, for example, a clear transparent plastic cover, is provided as the top that is supported by heat-insulating liquid-tight and air-tight-sealing materials, such as transparent plastic films as the walls 1806. Whereas, the heat-insulating transparent plate or film 1833 and the arch-shaped heat-insulating transparent ceiling 1805 together form the heat-insulating air chamber 1834 that is located above the solar panel 1801. The system also includes a source liquid pump/inlet 1810, an adjustable liquid outlet 1811 in communication with the liquid chamber 1804. This modified photovoltaic-panel-interfaced solarhouse 1800 can utilize solar waste heat to generate hot liquid while co-producing solar photovoltaic electricity. The use of antifreeze liquid in this system enables application of the technology in all seasons including freezing weather or cold geographic locations.

Figure 8C:
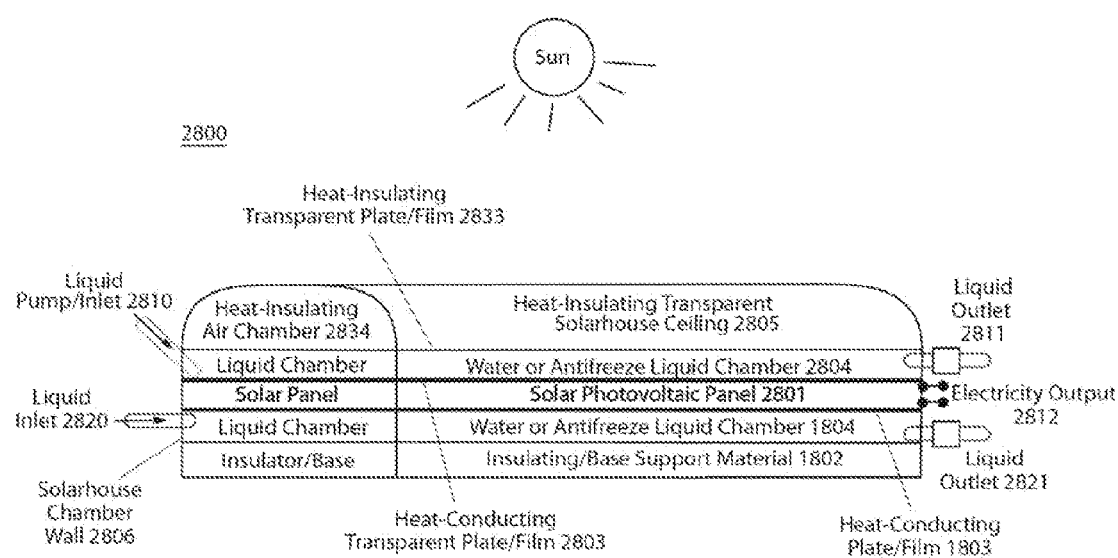
FIG. 8C is a representation of an embodiment of a modified photovoltaic panel-interfaced solarhouse system with two liquid chambers for making hot liquid while generating solar electricity on leveled fields, hill sides, roofs and walls.

A further exemplary embodiment of a modified photovoltaic-panel-interfaced solarhouse 2800 is illustrated in FIG. 8C, which is used to produce hot liquid coolant such as hot water or hot antifreeze liquid while co-generating solar electricity. This modified photovoltaic-panel-interfaced solarhouse system has two liquid chambers: one (chamber 2804) located above solar panel 2801 and the other (chamber 1804) located below solar panel 2801. Briefly, this solarhouse system comprises: 1) A heat-tolerant photovoltaic panel 2801 mounted on top of a water (or antifreeze) liquid chamber 1804 that is constructed on an insulating support base 1802 as its bottom, using part of solarhouse wall 2806 as its walls and a flexible heat-conducting plate or film 1803 as its top interfacing with the photovoltaic-panel 1801 back (bottom) surface; 2) A heat-insulating transparent plate or film 2833 is provided in between the heat-insulating air chamber 2834 and the liquid chamber 2804 located above the top surface of solar photovoltaic panel 2801; 3) An arch-shaped heat-insulating transparent ceiling 2805, for example, a clear transparent plastic cover, is provided as the top that is supported by heat-insulating liquid-tight and air-tight-sealing materials, such as transparent plastic films as the walls 2806; 4) The water (or antifreeze) liquid chamber 2804 above solar panel 2801 is formed by the heat-conducting transparent plate or film 2803 as its top, part of the heat-insulating liquid-tight and air-tight-sealing walls 2806 as its walls, and the heat-conducting transparent plate/film 2803 as its bottom; 5) The heat-insulating transparent plate or film 2833 and the arch-shaped heat-insulating transparent ceiling 2805 together form the heat-insulating air chamber 2834 that is located on top of the liquid chamber 2804 above solar panel 2801; 6) The system also includes a source liquid pump/inlet 2810, an adjustable liquid outlet 2811 in communication with liquid chamber 1804, a liquid inlet 2820 and a liquid out 2821 in coordination with liquid chamber 2804, and a set of electricity output connectors 2812. Note, use of the two liquid chambers 2804 and 1804 enables more effective utilization of solar waste heat, co-beneficial to the performance of solar photovoltaic panel 2801.

Figure 8D:
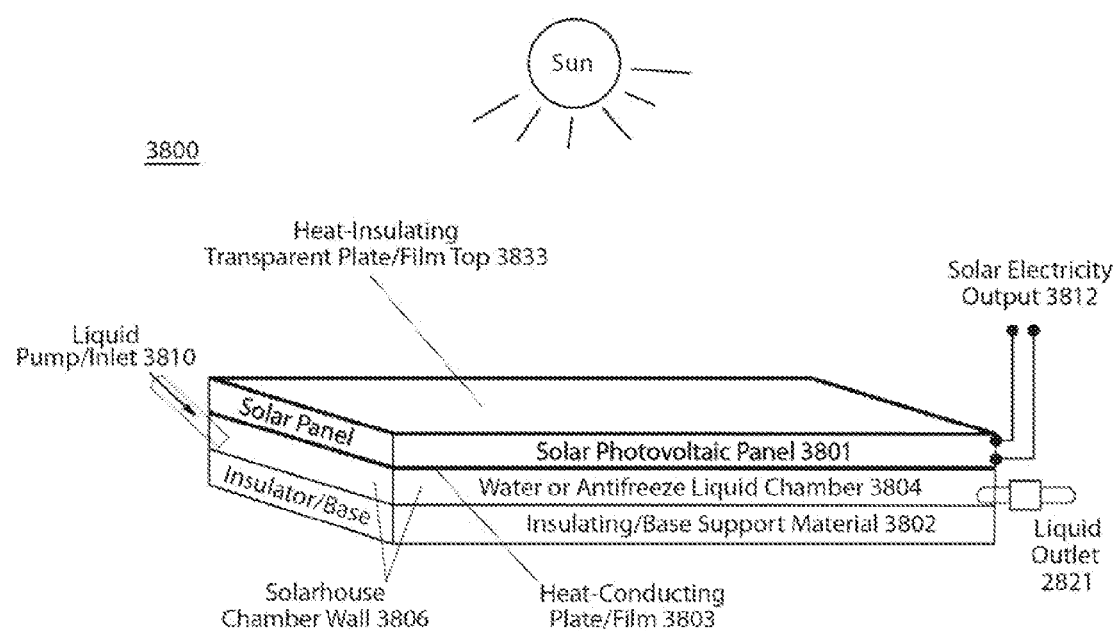
FIG. 8D is a representation of an embodiment of a modified photovoltaic panel-interfaced solarhouse system with a heat-insulating transparent plate or film retaining solar heat for making hot liquid while generating solar electricity on hill sides, roofs and walls.

Yet another exemplary embodiment of a modified photovoltaic-panel-interfaced solarhouse 3800 is illustrated in FIG. 8D, which is used to produce hot liquid coolant such as hot water or hot antifreeze liquid while co-generating solar electricity. This modified photovoltaic-panel-interfaced solarhouse system comprises: 1) A heat-tolerant photovoltaic panel 3801 mounted on top of a water (or antifreeze) liquid chamber 3804; 2) Water (or antifreeze) liquid chamber 3804 constructed beneath the back surface of solar panel 3801 is formed by the heat-insulating base support material 3802 as its bottom, part of the heat-insulating liquid-tight and air-tight-sealing walls 3806 as its walls, and the heat-conducting plate or film 3803 as its top interfacing (thermal contact) with the photovoltaic-panel 3801 back (bottom) surface; 3) A flexible heat-insulating transparent plate or film 3833 covers the top (front) surface of solar panel 3801 to help retain solar heat; and 4) The system also includes a source liquid pump/inlet 3810, an adjustable hot liquid outlet 3811 passing through the wall of liquid chamber 3804, and a set of electricity output connectors 3812 in communication with solar panel 3801.

Figure 8E:
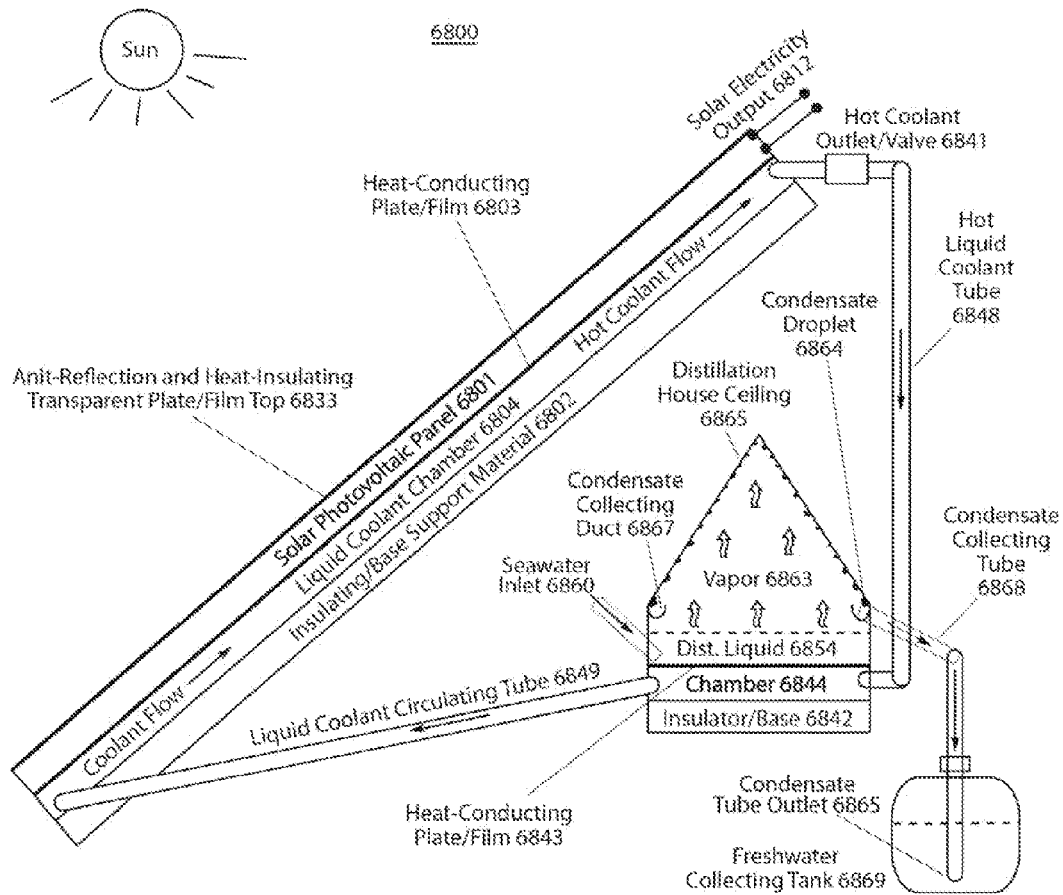
FIG. 8E is a representation of a photovoltaic solar-greenhouse distillation system coupled through a self-sustained circulating coolant fluid for heat exchange to make freshwater by distillation while co-generating solar electricity.

FIG. 8E illustrates another exemplary embodiment 6800 that is an innovative use of solarhouse 3800 model with a self-circulating coolant fluid for heat exchange with a distillation house to make distillation products such as seawater (distilled water) while co-generating electricity. As shown in FIG. 8E, the coolant-coupled photovoltaic solar-greenhouse distillation system 6800 comprises two major components: (1) a coolant circulating photovoltaic solarhouse system that generates hot coolant while co-generating electricity with a set of electricity output connectors 6812 in communication with solar panel 6801; and (2) a coolant-coupled distillation chamber 6854 system that generates distillation products such as freshwater by using the heat from heat-exchange with the hot coolant from the liquid coolant chamber 6804 of the photovoltaic solarhouse system. Specifically, the coolant circulating photovoltaic-panel-interfaced solarhouse system (major component 1) comprises: 1) Photovoltaic panel 6801 mounted on top of a liquid coolant (such as water or antifreeze) chamber 6804 connected with a liquid coolant circulating tube 6849 and a coolant outlet/valve 6841; 2) Liquid coolant chamber 6804 constructed at the back surface of the solar panel 6801 is formed by the heat-insulating base support material 6802 as its bottom, part of the heat-insulating liquid-tight and air-tight-sealing walls as its walls, and the heat-conducting plate or film 6803 as its top interfacing (in thermal contact) with the photovoltaic-panel 6801 back (bottom) surface; and 3) Anti-reflection and heat-insulating transparent plate or film 6833 covers the top surface of solar panel 6801 to help retain solar heat. Meanwhile, the coolant-coupled distillation chamber system (major component 2) comprises: 4) Coolant chamber 6844 comprising an insulated base 6842 as its bottom, a plurality of walls as its side walls, and a heat-conducting plate (or film) 6843 as its top is connected with the liquid coolant chamber 6804 of the photovoltaic solarhouse system through a hot liquid coolant tube 6848 and a liquid coolant circulating tube 6849; 5) Distillation chamber system comprising distillation house ceiling 6865 as its top, a plurality of walls as its side walls, and a heat-conducting plate (or film) 6843 as its bottom in heat exchange (thermal contact) with the coolant chamber 6844; and 6) The system also includes a seawater inlet 6860 connected with the distillation chamber containing distillation liquid 6854 and vapor 6863, condensate droplet 6864, condensate collecting duct 6867, and condensate collecting tube 6868 leading to freshwater collecting tank 6869.

In this exemplary embodiment 6800 (FIG. 8E), the solar panel waste heat is taken by heat-exchanging coolant, such as water or an antifreeze liquid, in the liquid coolant chamber 6804 at the back of the solar panel 6801, which is preferably placed at a tilted angle (so that its upper end is significantly higher than its other end) to face the sun. As the coolant liquid heats up, its volume expands so that the heated liquid will flow up toward the outlet/valve 6841 at the solar-panel liquid coolant chamber's upper end that is connected to a distillation house's coolant chamber 6844 through an insulated hot-liquid-coolant tube 6848. After the hot coolant flows into the distillation house's coolant chamber 6844, it is cooled here by heat exchange through a heat-conducting plate (or film) 6843 with a distillation chamber liquid 6854 (such as seawater) where the heat is utilized to vaporize its seawater for distillation to make freshwater. On the other hand, when the coolant liquid is cooled, its liquid density increases so that it will flow from the distillation house's coolant chamber 6844 through a circulating coolant tube 6849 into the lower end of the solar-panel liquid chamber 6804. The combined effects of the rising hot coolant liquid flow toward the upper end of the solar-panel liquid chamber and the cooled coolant liquid flows from the distillation house's coolant chamber into the lower end of the solar-panel liquid chamber result in a self-sustained circulating coolant flow through the system (without an external pump) to provide beneficial cooling to the solar panel for solar electricity generation while utilizing the waste heat at the distillation house to make freshwater.

As shown in FIG. 8E, the distillation house with its ceiling 6865 in this system operates in a shade behind (or below) the solar panel 6801. In this way, the solar panels can fully use their sunlight collection area without any shading by any of their associated distillation-house ceilings in a given Earth surface area. Therefore, the ceiling surface sunlight reflection loss associated with the systems of FIG. 1-8C is eliminated in this system design (FIG. 8E).

Table 1 presents an example of an estimated solar-to-electricity-and-useful-heat-product energy conversion efficiency for this model design (FIG. 8E) in comparison with that of FIG. 2B. Assuming a 0.5% rise in photovoltaic efficiency for every degree (° C.) of cooling, a cooling by about 30° C. by solvent distillation or by passing a coolant liquid through the chamber underneath a solar panel would result in a photovoltaic efficiency improvement by 15%. Assuming waste-heat utilization efficiency of about 60% and 50% for the distillation and the hot-liquid-making-and-then-distillation designs of FIG. 2B and FIG. 8E, respectively, the solar-to-electricity-and-useful-heat-product total energy conversion efficiency is estimated to be about 60% for both cases (Table 1). This is about 3 or 4 times better than today's photovoltaic panel used alone without an interfaced solvent distillation system.

TABLE 1

Example of estimated solar-to-electricity-and-useful-heat-product energy conversion efficiencies of photovoltaic solar-greenhouse distillation systems.

|  | System for co-generation of electricity and freshwater (FIG. 2B) | System for co-generation of electricity and hot liquid and freshwater (FIG. 8E) |
|---|---|---|
| Ceiling surface sunlight reflection loss factor (Robertson et al 2011, DOI 10.1007/s11120-011-9631-7) | −15% | 0 |
| Photovoltaic improvement factor owing to cooling effect* | +15% | +15% |
| Solar-to-electricity energy conversion efficiency** | 15% | 17% |
| Improvement of process energy efficiency owing to waste-heat utilization*** | +43% | +43% |

TABLE 1-continued

Example of estimated solar-to-electricity-and-useful-heat-product energy conversion efficiencies of photovoltaic solar-greenhouse distillation systems.

| | System for co-generation of electricity and freshwater (FIG. 2B) | System for co-generation of electricity and hot liquid and freshwater (FIG. 8E) |
|---|---|---|
| Solar-to-electricity-and-useful-heat-product total energy conversion efficiency | 58% | 60% |
| Solar electricity generation*** | 0.72 kWh per $m^2$ per day | 0.816 kWh per $m^2$ per day |
| Freshwater production*** | 3.06 L per $m^2$ per day | 2.93 L per $m^2$ per day |

*Assuming a cooling by about 30° C. and a 0.5% rise in PV efficiency for every degree (° C.) of cooling;
**Assuming use of a photovoltaic panel with a solar-to-electricity energy conversion efficiency of 15% and the remainder 85% goes to heat;
***Assuming average solar radiation energy of 200 watts per day per square meter of horizontal surface, and waste-heat utilization efficiency about 60% and 50% for immediate distillation (FIG. 2B) and hot-liquid-coupled distillation (FIG. 8E), respectively.

Application of Photovoltaic Panel-Interfaced Distillation System for Salt Making According to one of the exemplary embodiments of the photovoltaic panel-interfaced distillation solarhouse system in accordance with the present invention, the system is used to make salt from seawater and/or brine and to produce electricity and freshwater. Therefore, sea salt can be generated from seawater while generating photovoltaic electricity (FIG. 3). Since the photovoltaic panel-interfaced distillation process is operated in a sealed solarhouse chamber, the distillation liquid is protected from rain, dusts, insects, bird droppings and other undesirable environmental elements or contaminates from which a conventional open pond/pan salt farm may suffer. Therefore, use of a photovoltaic panel-interfaced distillation solarhouse more reliably produces clean and quality sea salt products when compared to a conventional open pond/pan salt farm. Unlike the conventional open pond/pan salt farms that generally require a relatively dry season (any unseasonal rains could ruin their salt farm harvest), use of the photovoltaic-panel-interfaced distillation solarhouse systems of the present invention, e.g., FIG. 3, enables the making of quality sea salts even in the rainy season or in a rainy geographic regions, since the solarhouse distillation chamber system is sealed and can prevent rains from entering into the distillation liquid. Therefore, exemplary embodiments in accordance with the present invention also represent a rain-proof and dust-proof sea salt-making technology that can be deployed throughout the world and that enables utilization of brine instead of brine discharge into the environment.

As the rain-proof/dust-proof salt-making distillation process of the present invention progresses while co-generating solar electricity, the salt concentration in the distillation seawater/brine liquid gradually reaches above about 35%. At these concentrations, salt crystallization will occur initially as flakes that typically settle down to the bottom of the distillation chamber. Referring to FIG. 3, this salt making process is enhanced by feeding or blowing dry air into the distillation solarhouse chamber that is preferably equipped with a dry air pump 316 and a tail gas condensing/vent system 317. As dry air is introduced and flows through the brine liquid distillation 304 chamber, it accelerates evaporation by carrying the vapor from distillation brine liquid to the tail gas condensing/vent system, an embodiment of which is illustrated in FIG. 5, where water vapor is condensed to produce freshwater before air venting. The acceleration of water evaporation from distillation brine liquid enhances salt crystallization in the brine. The sea salt products can then be readily harvested from the salt-making distillation chamber. With a foldable plastic distillation solarhouse, the sea salt product can be harvested by rolling up the foldable plastic distillation chamber from one end to the other end with minimal cost.

According to one of the embodiments in accordance with the present invention, for example as illustrated in FIG. 3, the rain-proof/dust-proof salt-making operational process includes introducing clean seawater through an inlet into the solarhouse distillation chamber. Sunlight is used to drive both photovoltaic-panel electricity and heat generation at the distillation liquid chamber, and the solar waste heat is used to vaporize water from the distillation liquid. The vapor is condensed onto a tilted or arch-shaped transparent solarhouse ceiling, and the condensate, i.e., freshwater droplets, is collected with a set of condensate-collecting ducts around the solarhouse wall under the forces of surface-condensate interaction and gravity. The collected condensate, i.e., freshwater, is collected into a freshwater collecting/storage tank. Salt making and crystallization is enhanced by blowing dry air through the distillation brine/salt making chamber to the tail gas condensing/vent system, and the salt/brine products are harvested from the distillation brine/salt making chamber. The steps of this process are repeated iteratively for a plurality of operational cycles to achieve the desired products and results. This operational process includes the following specific process steps: a) Introducing clean seawater through an inlet into the solarhouse distillation chamber; b) Using sunlight to drive both photovoltaic-panel electricity and heat generation at the distillation liquid chamber; c) Using the solar waste heat to vaporize water from the distillation liquid; d) Condensing the vapor onto a tilted (or arch-shaped) transparent solarhouse ceiling; e) Collecting the condensate with a set of condensate-collecting ducts around the solarhouse wall by use of surface-condensate interaction and gravity; f) Transporting the collected condensate (freshwater) into a freshwater collecting/storage tank; g) Enhancing salt making/crystallization by blowing dry air through the distillation brine/salt making chamber to the tail gas condensing/vent system; h) Harvesting the salt/brine products from the distillation brine/salt making chamber; and i) repeating steps a) through h) for a plurality of operational cycles to achieve more desirable results.

The above process to use the photovoltaic-panel-interfaced distillation solarhouse system can be repeated for a plurality of operational cycles to achieve more desirable results. Any of the steps the steps a) through i) of this process described above can also be adjusted in accordance of the present invention to suit for certain specific conditions. For example, when a foldable plastic distillation brine/salt-making chamber is used as illustrated in FIG. 3, the step h) of salt/brine products harvesting can be accomplished by folding up the foldable plastic distillation brine/salt-making chamber from one end to the other with minimal cost. In practice, any of the steps a) through i) of the process can be applied in full or in part, and/or in any adjusted combination for enhanced salt and freshwater production from seawater while generating photovoltaic electricity in accordance of this invention.

Application of Solar Panel Distillation System for Screening of Brine Salinity Tolerant Photosynthetic Organisms In a conventional seawater desalination process such as multi-stage flash distillation or reverse osmosis, the resulting brine liquid is often discharged into the environment, which is a serious environmental concern. Reverse osmosis, for instance, may require the disposal of brine with salinity twice that of normal seawater. The benthic community cannot accommodate such an extreme change in salinity and many filter-feeding animals are destroyed by osmotic pressure when such brine water is returned to the ocean. Furthermore, the brine discharging flows are considerably large, generally up to 40% (for membrane based technologies, like reverse osmosis) and up to 90% (for thermal technologies, like multi-stage-flash, including cooling water) of the seawater intake flow rate. Therefore, any technology that could utilize large amounts of brine in a beneficial manner (instead of discharging the brine to the environment) would be helpful. The present invention can help address this issue as well, since it also teaches how to productively utilize the brine product as an algal culture medium for photobiological liquid mass culture, in addition to the rain-proof/dust-proof brine-to-salt making process described above with a photovoltaic panel-interfaced distillation solarhouse system.

Establishing the capability of using brine as a mass photobiological liquid culture medium is of primary importance since photobiological (such as algal) mass culture can potentially use large amounts of brine liquid for photosynthetic production of advanced biofuels and bioproducts. In order to establish such a capability to productively utilize brine liquid that contains more than 5% of salt, it is essential to develop certain special (and often rare) high-salinity tolerant species and/or strains of algae or blue-green algae (oxyphotobacteria including cyanobacteria and oxychlorobacteria). According to one of the various embodiments, the photovoltaic panel-interfaced distillation solar-greenhouse system and its associated saline/brine products can be used also to help develop, screen, and culture certain special photosynthetic organisms that are highly tolerant to salinity. Salinity is often associated with alkalinity. Therefore, it is a preferred practice to develop and screen for alkaliphilic (high pH tolerant) and halophilic (high salt tolerant) types of oxygenic photosynthetic strains.

According to one of the various embodiments, application of saline/brine products in development and screening (select) for highly salinity-tolerant photosynthetic organisms such as highly salt-tolerant algae or cyanobacteria will not only enable the use of saline/brine as a photobiological liquid culture medium, but also provide a significant approach in helping achieve species control for certain photobiological mass cultures. For example, in the conventional algal mass culture for production of advanced biofuels and/or bioproducts, an effective technique to achieve species control is often highly desirable to grow and maintain a relatively pure mass culture. A common challenge in many algal mass culture applications is that when the culture is growing, certain organic materials (such as acetate and/or ethanol) released from certain algal cells into the liquid medium could enable the growth of other undesirable microorganisms such as oxidative bacteria (heterotrophs) which can often mess up the algal culture. According to one of the various embodiments, this technical challenge could be overcome by using high-salinity brine (with salinity above 5% salt) as a liquid culture medium for certain special (rare) high-salinity tolerant photosynthetic organism such as an alkaliphilic (high pH tolerant) and/or halophilic alga and/or cyanobacterium, since most heterotrophs of freshwater origin cannot grow in such a brine medium with high salinity. Therefore, use of brine liquid as a high-salinity culture medium to allow only certain specially developed (or selected) salt-tolerant photosynthetic organisms such as certain highly salinity-tolerant rare algae (or cyanobacteria) strains to grow can represent a significant method to helping overcome this technical challenge in mass culture. That is, application of the photovoltaic panel-interfaced distillation solar-greenhouse system and its associated brine product as a tool to develop, screen, and culture certain special/rare salt-tolerant photosynthetic organisms is also an important strategy to enable utilization of brine liquid to grow a specially developed (or selected) salt-tolerant alga and, at the same time, to minimize undesirable heterotrophs in algal mass culture for photobiological production of advanced biofuels and bioproducts.

According to one of the various embodiments, algal salinity tolerance and other stress (including but not limited to pH, heat, and/or cold) tolerance can be measured by measuring their rates of photosynthesis such as $CO_2$ fixation and/or $O_2$ evolution in the presence of high salinity and/or alkaline pH in the liquid culture medium at various temperature conditions. Use of a dual- and/or multi-reactor-flow detection system can facilitate the measurements that include simultaneous measurement of $CO_2$ fixation, pH, $O_2$ and $H_2$ evolution, cells density, and actinic intensity. The advantage of a dual- (or multi-)reactor-flow detection system is that it allows to assay two or multiple different samples simultaneously at virtually identical conditions. Any systematic error of the dual-reactor system can be eliminated by interchanging two samples between the two reactors for each replication of assays. Therefore, use of this type of dual-reactor-flow systems can provide reliable measurements for screening of salinity tolerance and/or other environmental stress tolerance. The tolerance of other environmental stresses (such as alkalinity, heat and cold stresses) can be similarly measured and screened.

In one of the preferred embodiments, photosynthetic organisms for development and screening for high salinity tolerance are selected from the group consisting of algae and/or blue-green algae. The use of algae and/or blue-green algae has several advantages. They can be grown in an open pond and/or a photobiological reactor at large amounts and low costs. Algae suitable for development and screening of high salinity tolerance in accordance of the present invention include both unicellular algae and multi-unicellular algae. Multicellular algae that can be selected for use in this invention include, but are not limited to, seaweeds such as *Ulva latissima* (sea lettuce), *Ascophyllum nodosum, Codium fragile, Fucus vesiculosus, Eucheuma denticulatum, Gracilaria gracilis, Hydrodictyon reticulatum, Laminaria japonica, Undaria pinntifida, Saccharina japonica, Porphyra yezoensis*, and *Porphyra tenera*. Suitable algae can also be chosen from the following divisions of algae: green algae (Chlorophyta), red algae (Rhodophyta), brown algae (Phaeophyta), diatoms (Bacillariophyta), and blue-green algae (Oxyphotobacteria including Cyanophyta and Prochlorophytes). Suitable orders of green algae include Ulvales, Ulotrichales, Volvocales, Chlorellales, Schizogoniales, Oedogoniales, Zygnematales, Cladophorales, Siphonales, and Dasycladales. Suitable genera of Rhodophyta are *Porphyra, Chondrus, Cyanidioschyzon, Porphyridium, Gracilaria, Kappaphycus, Gelidium* and *Agardhiella*. Suitable genera of Phaeophyta are *Laminaria, Undaria, Macrocystis, Sargassum* and *Dictyosiphon*. Suitable genera of Cyanophyta (also known as Cyanobacteria) include (but not limited to) *Phoridium, Synechocystis, Syncechococcus, Oscillatoria*, and *Anabaena*. Suitable genera of Prochlorophytes (also known as oxychlorobacteria) include (but not limited to) *Prochloron, Prochlorothrix*, and *Prochlorococcus*. Suitable genera of Bacillariophyta are *Cyclotella, Cylindrotheca, Navicula, Thalassiosira*, and *Phaeodactylum*.

Preferred species of algae for use in the present invention include (but not limited to): *Dunaliella salina, Dunaliella viridis, Dunaliella bardowil, Crypthecodinium cohnii, Schizochytrium* sp., *Chlamydomonas reinhardtii, Platymonas subcordiformis, Chlorella fusca, Chlorella sorokiniana*,

*Chlorella vulgaris, 'Chlorella' ellipsoidea, Chlorella* spp., *Haematococcus pluvialis; Parachlorella kessleri, Betaphycus gelatinum, Chondrus crispus, Cyanidioschyzon merolae, Cyanidium caldarium, Galdieria sulphuraria, Gelidiella acerosa, Gracilaria changii, Kappaphycus alvarezii, Porphyra miniata, Ostreococcus tauri, Porphyra yezoensis, Porphyridium* sp., *Palmaria palmata, Gracilaria* spp., *Isochrysis galbana, Kappaphycus* spp., *Laminaria japonica, Laminaria* spp., *Monostroma* spp., *Nannochloropsis oculata, Porphyra* spp., *Porphyridium* spp., *Undaria pinnatifida, Ulva lactuca, Ulva* spp., *Undaria* spp., *Phaeodactylum Tricornutum, Navicula saprophila, Cylindrotheca fusiformis, Cyclotella cryptica, Euglena gracilis, Amphidinium* sp., *Symbiodinium microadriaticum, Macrocystis pyrifera, Ankistrodesmus braunii, Scenedesmus obliquus, Stichococcus* sp., *Platymonas* sp., *Dunalielki sauna*, and *Stephanoptera gracilis*.

Preferred species of blue-green algae (oxyphotobacteria including cyanobacteria and oxychlorobacteria) for development and screening of high salinity tolerance in accordance of the present invention include (but not limited to): *Thermosynechococcus elongatus* BP-1, *Nostoc* sp. PCC 7120, *Synechococcus elongatus* PCC 6301, *Syncechococcus* sp. strain PCC 7942, *Syncechococcus* sp. strain PCC 7002, *Synechocystis* sp. strain PCC 6803, *Prochlorococcus marinus* MED4, *Prochlorococcus marinus* MIT 9313, *Prochlorococcus marinus* NATL1A, *Prochlorococcus* SS120, *Spirulina platensis* (*Arthrospira platensis*), *Spirulina pacifica, Lyngbya majuscule, Anabaena* sp., *Synechocyitis* sp., *Synechococcus elongates, Synechococcus* (MC-A), *Trichodesmium* sp., *Richelia intracellularis, Synechococcus WH*7803, *Synechococcus WH*8102, *Nostoc punctiforme, Syncechococcus* sp. strain PCC 7943, *Synechocyitis* PCC 6714 phycocyanin-deficient mutant PD-1, *Cyanothece* strain 51142, *Cyanothece* sp. CCY0110, *Oscillatoria limosa, Lyngbya majuscula, Symploca muscorum, Gloeobacter violaceus, Prochloron didemni, Prochlorothrix hollandica, Prochlorococcus marinus, Prochlorococcus* SS120, *Synechococcus* WH8102, *Lyngbya majuscula, Symploca muscorum, Synechococcus bigranulatus*, cryophilic *Oscillatoria* sp., *Phormidium* sp., *Nostoc* sp.-1, *Calothrix parietina*, thermophilic *Synechococcus bigranulatus, Synechococcus lividus*, thermophilic *Mastigocladus laminosus, Chlorogloeopsis fritschii* PCC 6912, *Synechococcus vulcanus, Synechococcus* sp. strain MA4, *Synechococcus* sp. strain MA19, and *Thermosynechococcus elongatus*.

According to another embodiment, a salinity-tolerant photosynthetic organism can be developed through a mutagenesis/molecular genetic engineering and screening process that comprises the following steps: a) Mutagenizing and/or molecular genetic engineering of photosynthetic organisms; b) Selecting high salinity tolerant photosynthetic organisms in the presence of saline/brine at a critical salt concentration; c) Growing selected photosynthetic organisms into colonies for isolation and further selection; d) Growing a selected colony into a brine liquid culture; e) Further screening for high salt-tolerant photosynthetic organisms by measuring photosynthesis rate in the presence of high salinity at a salt concentration range from 3% to about 36% (salt saturation) and/or under certain other environmental conditions including (but not limited to) alkalinity, heat and cold stresses; and f) repeating steps a) through e) for a plurality of operational cycles to achieve more desirable results.

In practice, any of the steps a) through f) of this salt-tolerance developing process are applied in full or in part, and/or in any adjusted combination to achieve more desirable results. In one of the various embodiments, for example, the step of mutagenizing photosynthetic organisms is carried out by a series of mutagenesis techniques such as radiation induced mutagenesis, insertional mutagenesis, chemical-induced mutagenesis, and molecular genetic engineering of ion channels and ion transporters in cellar and subcellar (organelles) membranes that are known to those skilled in the art.

Development and screening for high-salinity tolerant photosynthetic organisms in combination with proper selection for their genetic backgrounds and certain special features is also beneficial. For example, a highly salt-tolerant designer alga created from cryophilic algae (psychrophiles) that can grow in snow and ice, and/or from cold-tolerant host strains such as *Chlamydomonas* cold strain CCMG1619, which has been characterized as capable of performing photosynthetic water splitting as cold as 4° C. (Lee, Blankinship and Greenbaum (1995), "Temperature effect on production of hydrogen and oxygen by *Chlamydomonas* cold strain CCMP1619 and wild type 137c," *Applied Biochemistry and Biotechnology* 51/52:379-386), permits photobiological mass culture with saline/brine liquid media even in cold seasons or regions such as Canada. Meanwhile, a highly salinity-tolerant designer alga created from a thermophilic/thermotolerant photosynthetic organism such as thermophilic algae *Cyanidium caldarium* and *Galdieria sulphuraria* and/or thermophilic cyanobacteria (blue-green algae) such as *Thermosynechococcus elongatus* BP-1 and *Synechococcus bigranulatus* may permit the practice of this invention to be well extended into the hot seasons or areas such as Mexico and the Southwestern region of the United States including Nevada, California, Arizona, New Mexico and Texas, where the weather can often be hot. Additional optional features of a highly salinity-tolerant designer alga include the benefits of reduced chlorophyll-antenna size, which has been demonstrated to provide higher photosynthetic productivity (Lee, Mets, and Greenbaum (2002). "Improvement of photosynthetic efficiency at high light intensity through reduction of chlorophyll antenna size," *Applied Biochemistry and Biotechnology*, 98-100: 37-48). By use of a phycocyanin-deficient mutant of *Synechocystis* PCC 6714, it has been experimentally demonstrated that photoinhibition can be reduced also by reducing the content of light-harvesting pigments (Nakajima, Tsuzuki, and Ueda (1999) "Reduced photoinhibition of a phycocyanin-deficient mutant of *Synechocystis* PCC 6714", *Journal of Applied Phycology* 10: 447-452). Therefore, in one of the various embodiments, a highly salinity-tolerant alga is selected from the group consisting of green algae, red algae, brown algae, blue-green algae (oxyphotobacteria including cyanobacteria and prochlorophytes), diatoms, marine algae, freshwater algae, unicellular algae, multicellular algae, seaweeds, alkaliphilic algal strains, halophilic algal strains, cold-tolerant algal strains, heat-tolerant algal strains, light-harvesting-antenna-pigment-deficient mutants, and combinations thereof.

According to another embodiment, a photovoltaic panel-interfaced distillation solar-greenhouse system (FIG. 4) can also be used to screen in-situ for salinity-tolerant photosynthetic organisms. For example, as the solarhouse distillation operates, when the salinity of the distillation liquid reaches a desired critical level, an inoculum sample (a relatively small volume, e.g., for about 0.1 to 1 liter) of algae or cyanobacteria culture (preferably at their logarithmic growth phase typically with their chlorophyll (Chl) concentration in a range of about 0.5-3 micrograms Chl per ml of liquid culture) can be introduced/inoculated into the distillation chamber saline/brine liquid (volumes 10 to 1000 liters, for example). Although this amount of inocular sample typically contains more than hundreds millions of algal cells, its introduction into a relatively large distillation chamber liquid (10 to 1000 liters, for example) does not significantly affect the optical properties of the distillation chamber liquid so that it will have no significant impact on the performance of the photovoltaic panel electricity generation. In this case, to provide a photoautotrophic growth condition as needed, the distillation saline/brine liquid is optionally supplemented with certain inorganic nutrients such as N, P, K at 1-10 mM concentration range. Photosynthetic culture growth may also require other mineral nutrients such as Mg, Ca, S, and Cl at the concentrations of about 0.5 to 1.0 mM, plus some trace elements Mn, Fe, Cu, Zn, B, Co, Mo among others at μM concentration levels. Depending on the brine sources, however, brine liquid typically contains sufficient amounts of these mineral nutrients. When/if needed, however, all of the mineral nutrients can be supplied in an aqueous minimal medium that can be made with well-established recipes of algal culture media using relatively small of inexpensive fertilizers and mineral salts such as ammonium bicarbonate ($NH_4HCO_3$) (or ammonium nitrate, urea, ammonium chloride), potassium phosphates ($K_2HPO_4$ and $KH_2PO_4$), magnesium sulfate heptahydrate ($MgSO_4.7H_2O$), calcium chloride ($CaCl_2$), zinc sulfate heptahydrate ($ZnSO_4.7H_2O$), iron (II) sulfate heptahydrate ($FeSO_4.7H_2O$), and boric acid ($H_3BO_3$), among others.

Among the inoculated algal (microbial) cells, only those that can tolerate high salinity and have the ability to perform photoautotrophic growth will be able to grow in the solarhouse distillation saline/brine liquid with the supply (feeding) of $CO_2$ (FIG. 4). Other algal cells that that cannot tolerate the high salinity will likely be photobleached by the sunlight and then die off typically within a few weeks, depending on the geographic location and weather conditions. It could take about 3 months or more (depending on growth conditions) for a single algal cell of high-salinity tolerance to populate the distillation chamber saline/brine liquid (volumes 10 to 1000 liters in this example) to a commonly visible level (about 0.5 microgram of Chl per ml). Because of the logarithmic feature of cells population growth pattern, for the majority (about 90%) of the time (e.g., 90 days), the distillation chamber saline/brine liquid (volumes 10 to 1000 liters in this example) stays essentially colorless, which is perfect to allow sunlight to go through for solar electricity generation by the photovoltaic panels underneath the distillation chamber saline/brine liquid. This feature also makes it quite attractive to use a solar-panel-interfaced distillation solarhouse for simultaneous production of electricity, freshwater, and, at the same time, for developing and screening in-situ for highly salinity-tolerant photosynthetic organisms while generating solar electricity. The salinity of the distillation liquid can be adjusted to any desired levels by adjusting the addition of new distillation liquid in relation to the solarhouse distillation liquid evaporation rate. Therefore, use of a solarhouse distillation system such as that shown in FIG. 4 can achieve in situ screening for salinity-tolerant photosynthetic organisms with a series of salt concentrations (salinity) levels from about 3% salt to: 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, up to the salt saturation concentration of about 35-36% salt in brine liquid.

When a high-salinity tolerant algal culture is obtained through the application of the solarhouse photobiological screening/culturing process (FIG. 4), the algal cell culture can then be characterized for many applications with arts known to those in the field. For example, use of high-salinity tolerant photosynthetic organisms as host organisms with synthetic biology/genetic transformation can create a series of high-salinity tolerant designer photosynthetic organisms for production of advanced biofuels such as hydrogen (H2), ethanol, butanol, biooils and etc. The arts for creating designer photosynthetic organisms through molecular genetics in combination with synthetic biology have recently been disclosed in International Application No. PCT/US2009/034780 and elsewhere.

According to one of the various embodiments, to achieve desirable results, a highly salinity tolerant photosynthetic organism such as alga or blue-green alga should be able to tolerate salinity at least above 5% salt, preferably above 10% salt, more preferably above 15% salt, and most preferably above 20% up to salt saturation concentration (about 35% salt) in a brine liquid culture medium. Success of developing such a super-high salinity tolerant strain of algae or blue-green algae (i.e., oxyphotobacteria such as cyanobacteria) that can tolerate above 20% up to saturation salt concentration (about 35% salt) in liquid culture media will enable productive utilization of brine liquid as a photobiological mass culture medium. Since most of the heterotrophic microorganisms of freshwater and/or seawater (3% salt) origin would unlikely be able to tolerate such a high salinity (20-35% salt), use of a super-high salinity tolerant (rare) algal strain that can use such a high-salt brine liquid (containing about 20-35% salt) will make it much easier to grow/maintain a relatively pure mass algal culture in brine liquid for photobiological production of advanced biofuels and bioproducts from $CO_2$ and $H_2O$. The advanced biofuels and bioproducts that may be produced through brine photobiological (algal) mass culture with synthetic biology applications are selected from the group consisting of: hydrogen (H2), ethanol, butanol/isobutanol, propanol, pentanol, hexanol, heptanol, octanol, nonanol, decanol, undecanol, dodecanol, tetradecanol, cetyl alcohol, stearyl alcohol, long chain alcohols, branched chain alcohols, higher alcohols, isoprenoids, hydrocarbons, biooils, lipids, DHA (docosahexaenoic acid) omega-3 fatty acid, EPA (eicosapentaenoic acid) omega-3 fatty acid, ARA (arachidonic acid) omega-6 fatty acid, acetic acid, proteins, chlorophylls, carotenoids, phycocyanins, allophycocyanin, phycoerythrin, their derivatives/related product species, and combinations thereof.

Note, when seawater (containing about 3% salt) is solar-house-distilled to the level of high-salt brine liquid (containing about 20-35% salt) in accordance of the present invention, nearly 90% of its water is extracted as freshwater. The residual brine liquid (containing about 20-35% salt) can now be used as a mass culture medium to grow the specially developed super-high salinity tolerant (rare) algae (or oxyphotobacteria) for photobiological production of advanced biofuels and bioproducts. The used brine algal culture can be harvested for extraction of biomass and biofuels (such as lipids/biooils), or processed through further distillation/evaporation to make a dry algal biomass/salt mixture that may be used as animal feed supplement. In addition, the dry algal biomass/salt mixture can also be pyrolyzed or combusted to produce energy and crude salt that could have other applications including for use as a deicing road salt. Therefore, this embodiment also represents a holistic clean solar photovoltaic/distillation energy technology system that can produce electricity, freshwater, sea salt, and brine algal culture with nearly zero waste discharge.

Operations of Multiple Distillation Solarhouses

According to one embodiment, any number of various photovoltaic panel-interfaced distillation solarhouses (such as 1, 2, 3, 4, 5, 6, 7, 8, 9, 10, 11, 12, and etc.) may be used in series, in parallel, and/or in combination with photobioreactor greenhouse distillation systems to achieve more desirable results including (but not limited to) production and harvesting of advanced biofuels and bioproducts such as ethanol.

Figure 9A:
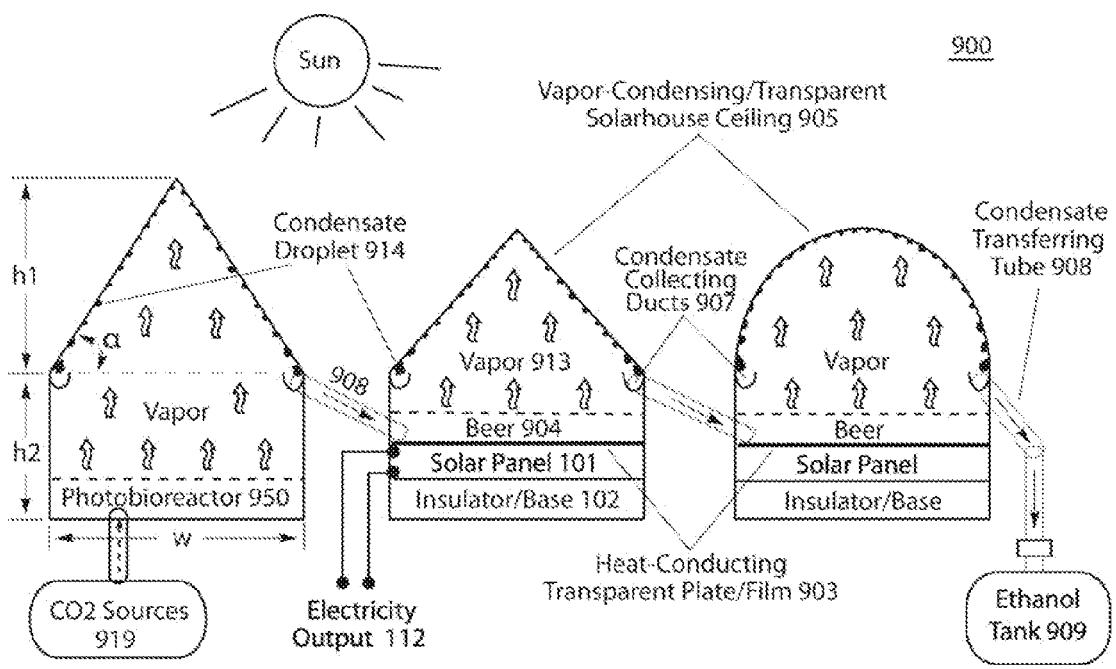
FIG. 9A is a representation of the front view of an embodiment of an integrated system of photovoltaic panel-interfaced distillation solarhouses (middle, and right) coupled with ethanol-producing brine photobiological culture distillation greenhouse (left) for ethanol production and harvesting with multistage distillation while generating solar electricity.
Figure 9B:
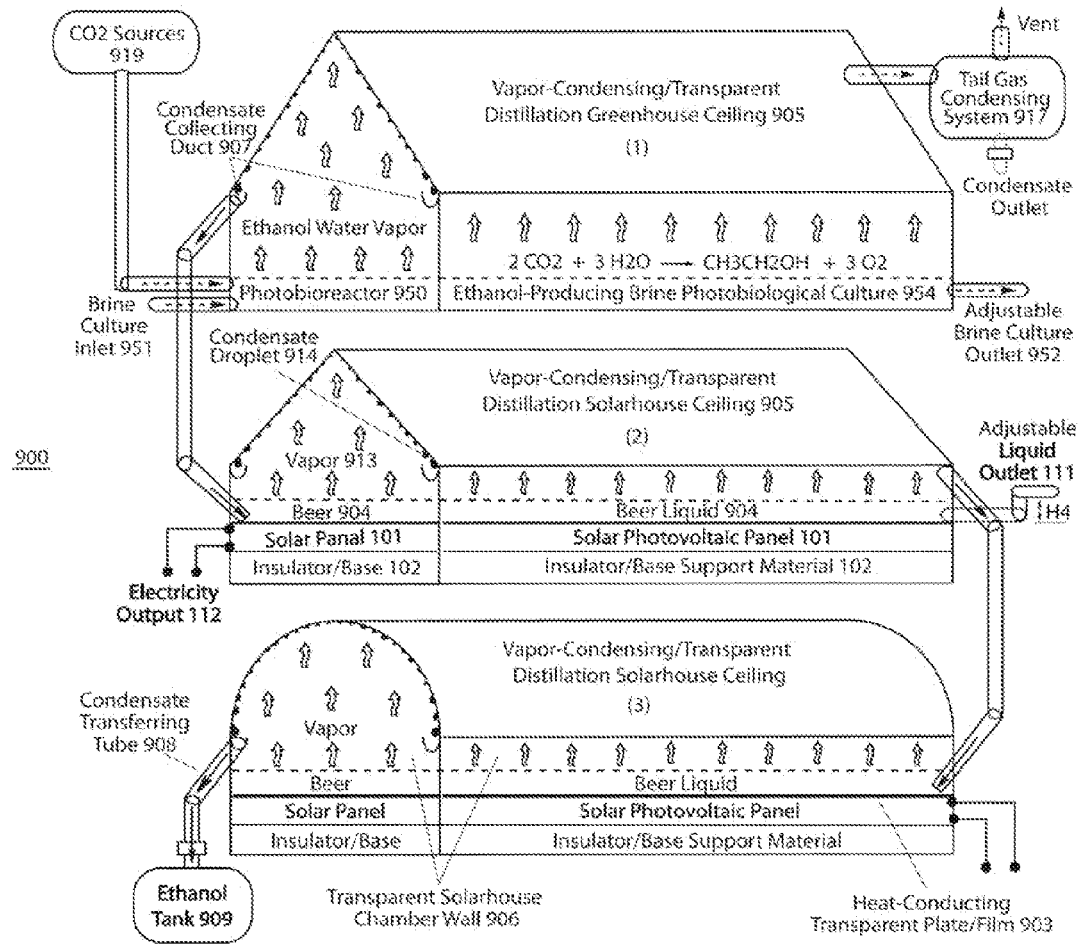
FIG. 9B is a representation of an embodiment of an integrated system of photovoltaic panel-interfaced distillation solarhouses (middle, and bottom) coupled with ethanol-producing brine photobiological culture distillation greenhouse (top) for ethanol production and harvesting with multistage distillation while generating solar electricity.

Examples of these embodiments are illustrated in FIGS. 9A and 9B with an integrated system 900 of photovoltaic panel-interfaced distillation solarhouses coupled with ethanol-producing brine photobiological culture distillation greenhouse for ethanol production and harvesting with multistage distillation while generating solar electricity. As mentioned before, International Application No. PCT/US2009/034780 has recently disclosed certain methods on synthetic biology to create designer photosynthetic organisms (such as blue-green algae) for photobiological production of advanced biofuels such as ethanol from carbon dioxide $CO_2$ and water $H_2O$, and on a greenhouse distillation system technology to harvest the photobiologically produced ethanol from the ethanol-producing algal liquid mass culture. The exemplary embodiment of FIG. 9A illustrates how the condensate collected by the ducts in a photobiological ethanol-producing reactor 950/greenhouse can be transferred with a condensate-transporting tube 908 into the next solarhouse for re-distillation using a combined system 900 of multiple photovoltaic panel-interfaced solar-greenhouses. According to one of the various embodiments, it is a preferred practice to place the condensate collecting ducts in the first distillation greenhouse high enough so that the condensate collected by the ducts there can flow through a condensate-transporting tube into the next distillation solarhouse by use of gravity without requiring any pumping. As shown in FIG. 9A, the outlet of the condensate-transporting tube 908 should be immersed in the liquid, for example, beer 904 of the next solarhouse so that any undesirable exchange of vapor between the greenhouse and the solarhouse is properly blocked by the liquid.

The second solarhouse shown in FIG. 9A (middle) is an example of a solar panel-interfaced distillation chamber system where a liquid beer 904 from the photobiological ethanol-producing reactor 950/greenhouse is re-distilled using the solar waste heat from the photovoltaic panel 101 beneath the distillation chamber. That is, the condensate from the greenhouse (on the left, FIG. 9A) is transported through a tube into the solarhouse distillation chamber (middle, FIG. 9A) for redistillation. The distillation chamber and the photovoltaic panel of the solarhouse (middle, FIG. 9A) are separated by a transparent and impermeable plate and/or film (or membrane) 903 that allows only sunlight and heat to go through. Use of sunlight drives photovoltaic cells and co-generates heat energy that can raise the temperature of the distillation chamber above the photovoltaic panel. The co-generated solar heat is then used for re-evaporation of the ethanol-containing liquid (beer) at the distillation chamber above the photovoltaic panel 101. The vapor 913 is then re-condensed onto the inner surface of the ceiling 905 in the solarhouse as well. The condensate 914 of the distillation solarhouse is collected in a similar manner by using a tilted ceiling surface and a system of condensate-collecting ducts 907 around the greenhouse walls below the ceiling. The ethanol concentration in the condensate collected from the distillation greenhouse (FIG. 9A, middle) is now higher (typically in a range about 1-70% ethanol depending on the source beer and operating conditions) than that (about 0.5-40% ethanol) in the condensate collected at the distillation greenhouse (FIG. 9A, left). Higher and higher ethanol concentration can be achieved with further re-distillations using the third (FIG. 9A, right) and/or more distillation solarhouses. Therefore, this is also an example where sunlight energy (both the photovoltaic active photons and the associated waste solar heat) can be effectively used simultaneously for both photovoltaic electricity generation 112 and liquid distillation for harvesting of ethanol 909. As the number of redistillations increase, the resulting ethanol concentration in the condensates (distillates) usually increases. The maximum achievable ethanol concentration through this type of fractional distillation is 96% ethanol, which is sufficiently high in quality that can be used directly as a fuel to run ethanol-powered and/or flexible-fuel vehicles. Therefore, this process technology is designed to maximally utilize solar (both its visible and infra-red radiation) energy for: (1) photovoltaic electricity generation, (2) photobiological production of ethanol from $CO_2$ and $H_2O$, and (3) harvesting of the product ethanol through a series of distillation greenhouses and solarhouses with higher energy efficiency and minimal cost.

Note, sometimes, the product ethanol concentration in a large volume of the photobiological liquid culture medium could be as low as below 0.1% ethanol. It would be impractical to use the conventional ethanol-separation technologies such as the boiler-distillation-column-based ethanol-separation technologies to harvest ethanol from such a low concentration in such a large volume of the liquid live culture medium. However, with use of the solarhouse distillation technology (FIGS. 1-9), it is possible to harvest and/or enrich from such a dilute ethanol concentration (which sometimes could be as low as below 0.1% ethanol) of a photobiological liquid culture medium to first produce a beer liquid (condensate) that contains more than 3% ethanol so that can then be further processed with certain conventional ethanol-separation technologies including the boiler-distillation-column-based ethanol-separation technologies. In this case, the greenhouse distillation and photovoltaic panel-interfaced solarhouse distillation technology (FIGS. 1-9) can also be used in combination with the conventional ethanol-separation technologies including the boiler-distillation-column-based ethanol-separation technologies. In addition to solar electricity generation and photobiological production and harvesting of product ethanol, use of the technology can also produce freshwater, saline/brine products, and used brine biomass culture as byproducts. Therefore, the present invention is expected to have multiple applications with a higher solar-to-products energy-conversion efficiency than the current technology.

FIG. 9B also represents an example of an integrated solar photovoltaic electricity generation, photobiological ethanol-production and solar-heat-driven distillation system 900 which comprises multiple distillation solarhouses in combination with distillation greenhouse(s). In this example, the designer-organism culture 954 in the first distillation-greenhouse photobioreactor 950 (FIG. 9B, upper) photobiologically produces ethanol from carbon dioxide $CO_2$ and water $H_2O$. The product ethanol is harvested from the photobiological culture 954 by the solar-heat-driven distillation. The condensate collected from this distillation greenhouse (FIG. 9B, upper) is transported to the next photovoltaic-panel-based distillation solarhouse (FIG. 9B, middle) where the condensate is re-distillated with a series of distillation compartments. According to one of various embodiments, any number of distillation compartments (such as 2, 3, 4, 5, 6, 7, 8, 9, 10, 11, 12, and etc.) can be used in series and/or in parallel. As mentioned before, when the beer liquid passes through the distillation compartments (or distillation solarhouses) in series, the ethanol content in the beer liquid can be removed so that the residual liquid exiting from the last re-distillation compartment (distillation greenhouse or solarhouse) becomes largely pure freshwater that may be recycled for making culture media and/or for other use. That is, use of this integrated photovoltaic and brine photobiological ethanol-production process technology can also produce freshwater as a byproduct.

The condensates from the re-distillation are transferred to the third solarhouse (FIG. 9B, bottom), which can also comprises multiple distillation compartments for re-distillation. The final distillates from the third distillation solarhouse typically contain 10-90% ethanol, largely depending on the ethanol content of the source beers. Higher ethanol concentration can be achieved with further re-distillation. According to one of the various embodiments, any number of distillation compartments and/or solarhouses (such as 2, 3, 4, 5, 6, 7, 8, 9, 10, 11, 12, and etc.) can be used in series and/or in parallel. As the number of re-distillations increase, the resulting ethanol concentration in the condensates increases. The maximum achievable ethanol concentration through this type of fractional distillation is 96% ethanol with 4% water, because, at this concentration (96% ethanol, which is also known as an azeotropic mixture), the ethanol in the vapor is no longer more concentrated than that in the liquid phase and consequently the fractional distillation reaches its limit. Therefore, use of this multistage fractional distillation process that employs multiple photovoltaic panel-interfaced distillation solar-greenhouses in series and/or in parallel can harvest biofuel and bioproduct as ethanol from renewable resources such as cellulosic ethanol and photobiological ethanol while co-generating electricity.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. For instance, the photovoltaic panel-interfaced distillation solar-greenhouse technology systems (FIGS. 1-9) have been disclosed here in considerable detail with examples of producing freshwater and sea salt, and harvesting organic solvent/biofuel ethanol from a brine algal culture while generating photovoltaic electricity with utilization of solar waste heat. The same principle and methodologies disclosed here can be applied for other similar distillation liquids in addition to seawater as listed above: brackish water, saline water, brine liquid, surface water, groundwater, well-water, nonpotable water, photobiological liquid culture media, beer, methanol solutions, ethanol solutions, propanol solutions, 1-hydroxy-2-propanone solutions, butanol solutions, cyclohexanol solutions, tert-amyl alcohol, pentanol solutions, hexadecan-1-ol solutions, polyhydric alcohols solutions, alicyclic alcohols solutions, primary alcohol solutions, higher alcohols solutions, aldehyde solutions, aldehyde hydrate solutions, carboxylic acids solutions, lactose solutions, biomass-derived hydrolysate solutions, glucose solutions, fructose solutions, sucrose solutions, furanose solutions, pyranose solutions, monosaccharides solutions, oligosaccharides solutions, polysaccharides solutions, acetic acid solutions, propionic acid solutions, citric acid solutions, lactic acid solutions, acetone solutions, and other organic solutions and/or solvents, and combinations thereof.

Therefore, the invention in its broader aspects is not limited to the specific details, representative apparatus and methods, and illustrative examples shown and described. Accordingly, departures may be made from such details without departing from the spirit or scope of applicant's general inventive concept.

What is claimed is:

1. A method for creating photovoltaic panel-interfaced solarhouse liquid distillation to make distillation products while co-generating solar electricity on land and on water including sea surface, the method comprising using solar waste heat associated with electricity generation by a photovoltaic panel-interfaced distillation solarhouse system comprising an air-erectable and floatable photovoltaic panel-interfaced solarhouse distillation system comprising a liquid storage tank with an air space; the method further comprises using air space in the liquid storage tank to provide buoyancy for the system on a water surface; wherein the distillation products comprise at least one of freshwater, distilled water, hot steam, hot liquid, biofuels, bioproducts, salt, saline, brine, photobiological mass cultures for advanced biofuels and bioproducts comprising ethanol.

2. The method according to claim 1, wherein creating said photovoltaic panel-interfaced distillation solarhouse system comprises an air-erectable and floatable photovoltaic panel-interfaced solarhouse distillation system comprising:

an erectable and floatable distillation solarhouse comprising a condensate storage tank comprising a plurality of walls and a ceiling;

a photovoltaic panel-based distillation chamber disposed within the condensate storage tank, the distillation chamber comprising an open mouth located at a top of the distillation chamber to allow vapor to reach the vapor-condensing and transparent walls and ceiling of the condensate storage tank, the distillation chamber spaced from the walls of the condensate storage tank to allow condensate droplets to slide from the vapor-condensing ceiling and walls down into the condensate storage tank;

a transparent wall and splash-resistant baffle disposed around the chamber mouth to prevent the distillation liquid from spilling out into the condensate storage tank; and a tank air space within the condensate storage tank to impart buoyancy as part of a floatation mechanism and to separate a base support of the distillation chamber comprising an insulator material from the condensate storage tank liquid.

3. The method according to claim 1, wherein the method of creating photovoltaic panel-interfaced solarhouse liquid distillation to make distillation products while co-generating solar electricity further comprises:

introducing clean seawater as the distillation liquid through an inlet into a distillation chamber;

using sunlight to drive both electricity generation and heat generation in the distillation chamber at the photovoltaic panel;

using solar waste heat in the distillation chamber to vaporize water from the distillation liquid;

condensing the vaporized water onto a transparent solarhouse ceiling covering the distillation chamber;

collecting the condensed vaporized water using a set of condensate-collecting ducts disposed around distillation chamber below the ceiling;

transporting the collected condensed vaporized water into a freshwater storage tank;

blowing dry air through the distillation chamber to a tail gas condensing system in communication with the distillation chamber to enhance salt making and crystallization within the distillation chamber;

harvesting salt and brine products from the distillation chamber;

and when a foldable plastic distillation brine/salt-making chamber is used, salt and brine products harvesting is accomplished by folding up the foldable plastic distillation brine/salt-making chamber from one end to the other with minimal cost.

4. The method according to claim 1, wherein said biofuels and bioproducts are selected from the group consisting of hydrogen (H$_2$), ethanol, butanol/isobutanol, propanol, pentanol, hexanol, heptanol, octanol, nonanol, decanol, undecanol, dodecanol, tetradecanol, cetyl alcohol, stearyl alcohol, long chain alcohols, branched chain alcohols, higher alcohols, isoprenoids, hydrocarbons, biooils, lipids, DHA (docosahexaenoic acid) omega-3 fatty acid, EPA (eicosapentaenoic acid) omega-3 fatty acid, ARA (arachidonic acid) omega-6 fatty acid, acetic acid, proteins, chlorophylls, carotenoids, phycocyanins, allophycocyanin, phycoerythrin, their derivatives/related species, and combinations thereof.

5. The method according to claim 1, wherein the method further comprises photovoltaic panel-interfaced solar-greenhouse liquid distillation of biofuels, the method comprising:
   using a photobioreactor greenhouse distillation system to generate a biofuel comprising ethanol; and
   using solar waste heat associated with electricity generation by a plurality of photovoltaic panel-interfaced distillation solarhouse systems in communication with the photobioreactor greenhouse distillation system to drive both electricity generation and liquid distillation simultaneously to harvest distillation products comprising an increased concentration of ethanol, each photovoltaic panel-interfaced distillation solarhouse system comprising a photovoltaic panel and a distillation liquid comprising the biofuel in thermal contact with the photovoltaic panel.

6. The method according to claim 1, wherein the method of creating photovoltaic panel-interfaced solarhouse liquid distillation to make distillation products is an ethanol harvesting process comprising the following steps:
   a) Use of sunlight drives photovoltaic cells and co-generates heat energy that can raise the temperature of the distillation chamber above the photovoltaic panel;
   b) The co-generated solar heat is used for re-evaporation of the ethanol-containing liquid (beer) at the distillation chamber above the photovoltaic panel;
   c) The vapor is re-condensed onto the inner surface of the ceiling in the solarhouse as well;
   d) The condensate of the distillation solarhouse is collected by using a tilted ceiling surface and a system of condensate-collecting ducts around the greenhouse walls below the ceiling;
   e) The ethanol concentration in the condensate collected from the distillation greenhouse is now higher than that in the condensate collected at the distillation greenhouse;
   f) Higher and higher ethanol concentration can be achieved with further re-distillations using the third and more distillation solarhouses operated in series, in parallel, and in combination thereof.

* * * * *